(12) United States Patent
Watanabe et al.

(10) Patent No.: US 11,128,932 B2
(45) Date of Patent: Sep. 21, 2021

(54) VIDEO DISTRIBUTION SYSTEM FOR LIVE DISTRIBUTING VIDEO CONTAINING ANIMATION OF CHARACTER OBJECT GENERATED BASED ON MOTION OF ACTORS

(71) Applicant: Gree, Inc., Tokyo (JP)

(72) Inventors: Masashi Watanabe, Tokyo (JP); Yasunori Kurita, Tokyo (JP)

(73) Assignee: GREE, INC., Tokyo (JP)

(*) Notice: Subject to any disclaimer, the term of this patent is extended or adjusted under 35 U.S.C. 154(b) by 0 days.

(21) Appl. No.: 16/407,733

(22) Filed: May 9, 2019

(65) Prior Publication Data

US 2019/0349648 A1    Nov. 14, 2019

(30) Foreign Application Priority Data

May 9, 2018   (JP) .............................. JP2018-090907
Nov. 30, 2018  (JP) .............................. JP2018-224331

(51) Int. Cl.
    *H04N 21/81*     (2011.01)
    *G06T 7/20*     (2017.01)
    *H04N 21/854*     (2011.01)
    *H04N 21/266*     *H04N 21/2187*
    (2011.01)

(52) U.S. Cl.
    CPC .......... *H04N 21/8146* (2013.01); *G06T 7/20* (2013.01); *H04N 21/2187* (2013.01); *H04N 21/266* (2013.01); *H04N 21/854* (2013.01)

(58) Field of Classification Search
    CPC ........... H04N 21/2187; H04N 21/8146; H04N 21/8153; G06T 7/20
    See application file for complete search history.

(56) References Cited

U.S. PATENT DOCUMENTS 3,733,857 A * 5/1973 Kohl ...................... D04B 27/06
    66/214
5,923,337 A * 7/1999 Yamamoto .............. G06T 13/80
    345/473

(Continued)

FOREIGN PATENT DOCUMENTS

CA     2285069 A1 * 10/1998 ............. G06F 16/34
CN     102595340 A     7/2012

(Continued)

OTHER PUBLICATIONS

Rejection Decision dated Mar. 19, 2019 issued in corresponding Japanese Patent Application No. 2018-144683 with English translation.

(Continued)

*Primary Examiner* — Robert J Hance
(74) *Attorney, Agent, or Firm* — Pillsbury Winthrop Shaw Pittman, LLP

(57) ABSTRACT

A video distribution system in one embodiment includes a distribution server configured to live distribute a video that contains an animation of a character object generated based on actor's motions to a first client device used by a first user, a first display device disposed at a position viewable by the actor and displaying the video, and a supporter computer causing first additional information to be displayed in the video displayed on the first display device based on a first operation input while causing the first additional information to be undisplayed on the first client device.

16 Claims, 20 Drawing Sheets

(56) References Cited

U.S. PATENT DOCUMENTS

| | | | | |
|---|---|---|---|---|
| 6,070,269 | A | * | 6/2000 | Tardif .................... G06F 3/011 2/69 |
| 10,498,794 | B1 | * | 12/2019 | Keighran ........... H04N 21/4788 |
| 2007/0197296 | A1 | | 8/2007 | Lee |
| 2008/0052242 | A1 | | 2/2008 | Merritt |
| 2008/0222262 | A1 | | 9/2008 | Oh |
| 2009/0019053 | A1 | | 1/2009 | Burgess |
| 2009/0319601 | A1 | | 12/2009 | Zvonaric et al. |
| 2010/0100904 | A1 | | 4/2010 | Kawakami |
| 2011/0025689 | A1 | | 2/2011 | Perez |
| 2011/0246329 | A1 | | 10/2011 | Geisner |
| 2011/0288912 | A1 | | 11/2011 | McCrea |
| 2013/0038601 | A1 | | 2/2013 | Han |
| 2013/0120365 | A1 | | 5/2013 | Lee et al. |
| 2013/0145269 | A1 | | 6/2013 | Latulipe |
| 2013/0215116 | A1 | | 8/2013 | Siddique |
| 2014/0013200 | A1 | | 1/2014 | White |
| 2014/0215512 | A1 | | 7/2014 | Maruyama et al. |
| 2015/0082203 | A1 | | 3/2015 | James et al. |
| 2016/0093078 | A1 | | 3/2016 | Davis et al. |
| 2016/0261902 | A1 | * | 9/2016 | Yerli ................. H04N 21/2662 |
| 2016/0267699 | A1 | * | 9/2016 | Borke .................... G06F 3/011 |
| 2016/0277802 | A1 | * | 9/2016 | Bernstein ........... H04N 21/4325 |
| 2017/0192496 | A1 | * | 7/2017 | Balslev .................. G06T 13/40 |
| 2017/0223422 | A1 | | 8/2017 | Maruyama |
| 2017/0364860 | A1 | | 12/2017 | Wilkinson |
| 2017/0368454 | A1 | * | 12/2017 | Sivak .................... A63F 13/352 |
| 2018/0012407 | A1 | | 1/2018 | Chuang |
| 2018/0070026 | A1 | * | 3/2018 | Nussbaum ......... H04N 5/23293 |
| 2018/0082430 | A1 | | 3/2018 | Sharma et al. |
| 2018/0192154 | A1 | * | 7/2018 | Paul .............. H04N 21/234336 |
| 2018/0342106 | A1 | | 11/2018 | Rosado |
| 2019/0102929 | A1 | * | 4/2019 | Davis ................. G06F 21/6209 |
| 2019/0266807 | A1 | | 8/2019 | Lee |
| 2020/0014982 | A1 | | 1/2020 | Iwaki |
| 2020/0204871 | A1 | * | 6/2020 | Bai .................... G06K 9/00228 |

FOREIGN PATENT DOCUMENTS

| | | | | |
|---|---|---|---|---|
| CN | 10379812 | A | | 5/2014 |
| CN | 106550278 | | | 3/2017 |
| CN | 107248195 | A | * | 10/2017 |
| EP | 1912175 | A1 | * | 4/2008 ........... G06T 13/205 |
| JP | 2001-137541 | A | | 5/2001 |
| JP | 2002-344755 | A | | 11/2002 |
| JP | 2002-344775 | A | | 11/2002 |
| JP | 2003-091345 | A | | 3/2003 |
| JP | 2010-033298 | A | | 2/2010 |
| JP | 2012-120098 | A | | 6/2012 |
| JP | 2013-243531 | A | | 12/2013 |
| JP | 2015-090526 | A | | 5/2015 |
| JP | 2015-184689 | A | | 10/2015 |
| JP | 2016-174941 | A | | 10/2016 |
| JP | 2017-022555 | A | | 1/2017 |
| JP | 2017-121036 | A | | 7/2017 |
| JP | 2018-511846 | A | | 4/2018 |
| JP | 2015-112386 | A | | 6/2018 |
| JP | 6382468 | B1 | | 8/2018 |
| JP | 6397595 | B | | 9/2018 |
| JP | 6420930 | B | | 11/2018 |
| WO | 2010/138428 | A2 | | 12/2010 |
| WO | 2017/159383 | A1 | | 9/2017 |
| WO | 2018/142494 | A1 | | 8/2018 |

OTHER PUBLICATIONS

Notice of Reasons for Refusal dated Nov. 27, 2018 issued in corresponding Japanese Patent Application No. 2018-159802 with English translation.
Office Action dated Jun. 12, 2018, issued in corresponding JP Application No. 2018-089628 with English translation.
Hasegawa Yusuke, Opening of virtual idle new time. Project MariA, CG World, Japan, Born Digital, Inc., Nov. 10, 2017, vol. 231, pp. 74-79.
Ando Sachio, "Live communicating animation" realized by MOCAP+ Unity. CG World, Japan, Works Corporation, Inc., Jun. 10, 2014, vol. 190, pp. 48-49.
Office Action dated Sep. 18, 2018 issued in corresponding Japanese Patent Application No. 2018-144682 with English translation.
International Search Report dated Dec. 17, 2019 issued in corresponding International Patent Application No. PCT/JP2016/043639 with English translation.
Written Opinion of the International Searching Authority dated Dec. 17, 2019 issued in corresponding International Patent Application No. PCT/JP2016/043639 with English translation.
Non-final Office Action Japanese Patent Application No. 2019-009432 dated May 21, 2019 with English translation.
Broadcast with Fans! "AniCast" with User-gifting Function, [online], Japan, XVI Inc., Apr. 5, 2018, the Internet <URL: http://www.xvi.co.jp/wp-content/uploads/2018/04/AniCast-PressRelease.pdf>.
Decision for Refusal dated Nov. 12, 2019 issued in corresponding Japanese Patent Application No. 2019-009432 with English translation.
Igor de Souza Almeida et al., "AR-based video-mediated communication: A social presence enhancing experience", 2012, 14th Symposium on Virtual and Augmented Reality, pp. 125-130.
Sang-Yup Lee et al., "Real Time 3D Avatar for Interactive Mixed Reality", Proceedings of the 2004 ACM SIGGRAPH International Conference on Virtual Reality Continuum and Its Applications in Industry, VRCAI '04, Jan. 1, 2004, XP055083687, 6 pgs.
Seung-Tak Noh et al., "An HMD-based Mixed Reality System for Avatar-Mediated Remote Collaboration with Bare-hand Interaction", International Conference on Artificial Reality and Telexistence Eurographics Symposium on Virtual Environments (2015), 8 pgs.
"Virtual Cast what is Totsu"_nicovideo [online, searched on Nov. 25, 2018], the Internet URL : https://qa.nicovideo.jp/faq/show/10740?back=front%2Fcategory%3Ashow&category_id=718&page=1&, 4 pgs., with partial English translation.
Notice of Reasons for Refusal dated Jan. 29, 2019 issued in corresponding Japanese Patent Application No. 2018-232307 with English translation.
Comprehensive explanation! "What is a "virtual cast" that anyone can become a VTuber?", Apr. 21, 2019, [search on Jan. 17,], Internet <URL: https://www.moguravr.com/virtualcast - 2 />, and the Internet </> [online],2018.
Notice of Reasons for Refusal dated Jan. 29, 2019 issued in corresponding Japanese Patent Application No. 2018-236152 with English translation.
What is TwitCasting? What kind of service?, Nov. 24, 2019, [search on Jan. 21,], Internet <URL: https://appli-world.jp/posts/1497> [online], 2018.
TwitCast block method and release method, What happens if you are an NG user? on May 22, 2019 [search on Jan. 21,], Internet <URL: https://beginner.[online]2017.Com/twitcasting-block-4529>.
Shinonome Megu, Birthday Specialised Distribution, Apr. 6, 2016, Internet <URL: https://panora.tokyo/58119 /> (documents showing well-known arts ; documents newly cited ; Documents that show well-known arts ; documents newly cited) 19 [online],2018.
Non-final Office Action dated Dec. 10, 2019 issued in corresponding Japanese Patent Application No. 2019-203861 with English translation.
Extended European Search Report dated Aug. 21, 2019 issued in corresponding EP Application No. 19173227.0.
Hsien-Tsung Chang et al., "A Dynamic Filling Room Based on Microsoft Kinect and Augmented Reality Technologies", Human-Computer Interaction, Part IV, HCII 2013, LNCS 8007, pp. 177-185, 2013, XP047034463.
G. Trogemann et al., "Mixed Realities: Integration Virtueller Objekte in Realaufnahmen", FKT Fernseh Und Kinotechnik, Fachverlag Schiele & Schon GmbH., Berlin, Germany, vol. 53, No. 1/02, Jan. 1, 1999, pp. 45-50, XP000878183.

(56) References Cited

OTHER PUBLICATIONS

International Search Report dated Dec. 17, 2019 issued in corresponding International Patent Application No. PCT/JP2019/043639 with English translation.
Written Opinion of the International Searching Authority dated Dec. 17, 2019 issued in corresponding International Patent Application No. PCT/JP2019/043639 with English translation.
Notice of Reasons for Refusal dated Feb. 12, 2020 issued in corresponding Japanese Patent Application No. 2018-144683 with English translation.
International Search Report PCT/JP2019/016555 dated May 28, 2019 with English translation.
Written Opinion of the International Searching Authority PCT/JP2019/016555 dated May 28, 2019 with English translation.
Re-examination Report Japanese Patent Application No. 2018-144683 dated Jul. 22, 2019 with English translation.
International Search Report PCT/JP2019/024876 dated Jul. 30, 2019 with English translation.
Written Opinion of the International Searching Authority PCT/JP2019/024876 dated Jul. 30, 2019 with English translation.
Board Decision Japanese Patent Application No. 2019-144682 dated Jul. 30, 2019 with English translation.
Why "Meg Shinonome" is So Cute? Secrets of the Booming Virtual Beauty, [online], Mogura Inc., Mar. 16, 2018, pp. 1 to 7, https://www.moguravr.com/shinonome-megu.
Office Action dated Sep. 18, 2018 issued in corresponding Japanese Patent Application No. 2018-1441682 with English translation.
Rejection Decision dated Dec. 4, 2018 issued in corresponding Japanese Patent Application No. 2018-144682 with English translation.
Office Action dated Sep. 25, 2018 issued in corresponding Japanese Patent Application No. 2018-144683 with English translation.
Office Action dated Dec. 4, 2018 issued in corresponding Japanese Patent Application No. 2018-193258 with English translation.
Office Action dated Jan. 22, 2019 issued in corresponding Japanese Patent Application No. 2018-217228 with English translation.
Office Action dated Jun. 18, 2018, issued in corresponding Japanese Patent Application No. 2018-090907 with English translation.
Tarui Hideto, web browser "Blisk" for Web developers and testers based on "Chromium" was been in a formal version, [online], Impress, Inc., Nov. 2, 2016, and [Heisei 30 Jun. 18, 2018 searched], Internet <URL: With restriction of https://forest.watch.impress.co.jp/docs/news / 1027949.html>.
Non-final Office Action dated Jul. 8, 2020 issued in corresponding U.S. Appl. No. 16/552,367.
International Search Report dated Apr. 2, 2020 issued in corresponding International Application No. PCT/JP2019/047384 with English translation.
Written Opinion of the International Searching Authority dated Apr. 2, 2020 issued in corresponding International Application No. PCT/JP2019/047384 with English translation.
Decision of Refusal dated Jun. 16, 2020 issued in corresponding Japanese Patent Application No. 2019-203861 with English translation.
Reconsideration Report by Examiner before Appeal dated Jun. 16, 2020 issued in corresponding Japanese Patent Application No. 2019-009432 with English translation.
Non-final Office Action dated Apr. 1, 2020 issued in corresponding U.S. Appl. No. 16/406,195.
Non-final Office Action dated Apr. 29, 2020 issued in corresponding U.S. Appl. No. 16/406,494.
Defendant's Brief No. 1, dated Dec. 9, 2019, filed in corresponding Japanese Patent Application No. 2018-144682.
Defendant's Evidence No. 1, dated Dec. 9, 2019, filed in corresponding Japanese Patent Application No. 2018-144682.
Defendant's Evidence No. 2, dated Dec. 9, 2019, filed in corresponding Japanese Patent Application No. 2018-144682.
Evidence Statement, dated Dec. 9, 2019, filed in corresponding Japanese Patent Application No. 2018-144682.
Evidence Statement, dated Jan. 28, 2020, filed in corresponding Japanese Patent Application No. 2018-144682.
Judicial Decision, dated Sep. 24, 2020, filed in corresponding Japanese Patent Application No. 2018-144682.
Plaintiff's Brief No. 1, dated Oct. 30, 2019, filed in corresponding Japanese Patent Application No. 2018-144682.
Plaintiff's Brief No. 1, dated Jan. 28, 2020, issued in corresponding Japanese Patent Application No. 2018-144682.
Plaintiff's Evidence No. 10, dated Jan. 28, 2020, issued in corresponding Japanese Patent Application No. 2018-144682.
Plaintiff's Evidence No. 11, dated Jan. 28, 2020, issued in corresponding Japanese Patent Application No. 2018-144682.
Plaintiff's Evidence No. 9-1, dated Jan. 28, 2020, issued in corresponding Japanese Patent Application No. 2018-144682.
Plaintiff's Evidence No. 9.2, dated Jan. 28, 2020, issued in corresponding Japanese Patent Application No. 2018-144682.
Plaintiff's Evidence No. 8, dated Jan. 28, 2020, issued in corresponding Japanese Patent Application No. 2018-144682.
Office Action dated Aug. 25, 2020 issued in corresponding Japanese Patent Application No. 2019-117684 with English translation (10 pgs.).
Final Office Action dated Sep. 14, 2020 issued in corresponding U.S. Appl. No. 16/406,195 (18 pgs.).
Notice of Allowance dated Oct. 29, 2020 issued in corresponding U.S. Appl. No. 16/552,367 (8 pgs.).
Notice of Reasons for Refusal dated Oct. 13, 2020 issued in corresponding Japanese Patent Application No. 2019-170275 with English translation (18 pages).
Office Action dated Jul. 24, 2020 issued in corresponding U.S. Appl. No. 16/406,494 (15 pgs.).
Non-final Office Action dated Jun. 23, 2020 issued in corresponding Japanese Patent Application No. 2020-025429 with English translation (9 pgs.).
Non-final Office Action dated Nov. 17, 2020 issued in corresponding U.S. Appl. No. 16/406,494 (15 pages).
Notice of Reasons for Refusal dated Dec. 1, 2020 issued in corresponding Japanese Patent Application No. 2020-025429 with English translation (14 pgs.).
Communication pursuant to Article 94(3) EPC dated Nov. 24, 2020 issued in corresponding European Patent Application No. 19 173 227.0 (7 pgs.).
Reconsideration Report by Examiner before Appeal dated Nov. 20, 2020, issued in corresponding Japanese Patent Application No. 2019-203861 with English translation (19 pgs.).
Notice of Reasons for Refusal dated Nov. 4, 2020 issued in corresponding Japanese Patent Application No. 2019-009432 with English translation (30 pgs.).
Notice of Reasons for Refusal dated Feb. 25, 2019, issued in corresponding Japanese Patent Application No. 2018-144682 with English translation (11 pgs.).
Notice of Reasons for Refusal dated Dec. 28, 2018, issued in corresponding Japanese Patent Application No. 2018-224331 with English translation (12 pgs.).
Decision for Refusal dated Apr. 13, 2021, issued in corresponding Japanese Patent Application No. 2019-170275 with English translation (9 pgs.).
Call and Response? Real-time Live "Project MariA" using Unity, Oct. 12, 2017, [search] on Apr. 13, 1991, the internet URL: https://cgworld.jp/feature/201710-cgw231hs-mato3.html (4 pgs.).
First Office Action dated Mar. 31, 2021, issued in corresponding Chinese Patent Application No. 201910373582.0 with English translation (13 pgs.).
First Office Action dated Mar. 31, 2021, issued in corresponding Chinese Patent Application No. 201910374844.5 with English translation (25 pgs.).
U.S. Final Office Action issued in corresponding U.S. Appl. No. 16/406,494 dated Feb. 23, 2021 (16 pgs.).
Decision of Refusal dated Feb. 16, 2021, issued in corresponding Japanese Patent Application No. 2019-117684 with English translation (11 pgs.).

(56) References Cited

OTHER PUBLICATIONS

Reconsideration Report by Examiner Before Appeal dated Jul. 14, 2021, issued in corresponding Japanese Patent Application No. 2019-117684 with English translation (8 pgs.).

* cited by examiner

| Account information | Possessed object |
|---|---|
| User ID | Object ID |

Fig. 3

| Account information | Decorative object for which display request made |
|---|---|
| User ID | Object ID |

Fig. 4

VIDEO DISTRIBUTION SYSTEM FOR LIVE DISTRIBUTING VIDEO CONTAINING ANIMATION OF CHARACTER OBJECT GENERATED BASED ON MOTION OF ACTORS

CROSS-REFERENCE TO RELATED APPLICATIONS

This application is based on and claims the benefit of priority from Japanese Patent Application Serial No. 2018-90907 (filed on May 9, 2018) and Japanese Patent Application Serial No. 2018-224331 (filed on Nov. 30, 2018), the contents of which are hereby incorporated by reference in its entirety.

TECHNICAL FIELD

The present disclosure relates to a video distribution system for live distribution of a video containing animation of a character object generated based on motions of an actor.

BACKGROUND

Video distribution systems that produce an animation of a character object based on actor's motions and live distribute a video containing the animation of the character object have been known. Such a video distribution system is disclosed, for example, in Japanese Patent Application Publication No. 2015-184689 ("the '689 Publication").

During a live distribution of a video, unexpected situations such as a failure of a device that is used to generate animation may occur. In the above-mentioned conventional video distribution system, the live distribution of the video is carried out only by an actor and an operator of a camera. If the actor or the camera operator has to handle such an unexpected situation during the live distribution, his/her motions to work on the failure or the like may be reflected in motions of a character object, or inappropriate camera work may occur. Consequently, the quality of the live distributed video may be adversely affected.

SUMMARY

It is an object of the present disclosure to provide a technical improvement which solves or alleviates at least part of the drawbacks of the prior art mentioned above. More specifically, one object of the disclosure is to provide a video distribution system that makes it easier to handle with an unexpected situation occurred during a live distribute.

A video distribution system according to one aspect includes a distribution server configured to live distribute a video that contains an animation of a character object generated based on actor's motions to a first client device used by a first user, a first display device disposed at a position viewable by the actor and displaying the video, and a supporter computer causing first additional information to be displayed in the video displayed on the first display device based on a first operation input while causing the first additional information to be undisplayed on the first client device.

In the video distribution system, the supporter computer may cause second additional information to be displayed in the video displayed on the first display device and in the video displayed on the first client device based on a second operation input.

In the video distribution system, the supporter computer may cause a modified character object in which at least a part of the character object is modified to be generated based on a third operation input and cause the modified character object to be included in the video.

In the video distribution system, the character object may have a face portion that is generated so as to move based on face motion data representing face motions of the actor, and the distribution server device may display third additional information in the face portion based on the third operation input.

The video distribution system may further include a storage storing a decorative object displayed in association with the character object, and the supporter computer may display a blind object for hiding at least a part of the character object when the decorative object is displayed in the video based on a forth operation input.

In the video distribution system, the distribution server device may be configured to live distribute the video to a second client device used by a second user in addition to the first client device, the first client device is a first type device, the second client device is a second type device different from the first type device, and the supporter computer may include a second display device that displays a display image of the video displayed on the first client device and a display image of the video displayed on the second client device.

In the video distribution system, the supporter computer may prohibit distribution of the video to the first user based on a fifth operation input.

Another aspect of the invention relates to a method of distributing a video performed by executing computer readable instructions by one or more computer processor. The method includes live distributing a video that contains an animation of a character object generated based on actor's motions to a first client device used by a first user, displaying the video on a first display device disposed at a position viewable by the actor, and displaying first additional information in the video displayed on the first display device based on a first operation input while causing the first additional information to be undisplayed on the first client device.

Yet another aspect of the invention relates to a computer-readable tangible non-transitory storage medium including a program executed by one or more computer processors. The computer program causes the one or more computer processors to perform live distributing a video that contains an animation of a character object generated based on actor's motions to a first client device used by a first user, displaying the video on a first display device disposed at a position viewable by the actor, and displaying first additional information in the video displayed on the first display device based on a first operation input while causing the first additional information to be undisplayed on the first client device.

According to the aspects mentioned above, it is possible to provide a video distribution system that makes it easier to handle with an unexpected situation occurred during a live distribution.

BRIEF DESCRIPTION OF THE DRAWINGS

FIG. 3 illustrates a possession list stored in the video distribution system of FIG. 1.

FIG. 4 illustrates a candidate list stored in the video distribution system of FIG. 1.

DESCRIPTION OF THE PREFERRED EMBODIMENTS

Figure 1:
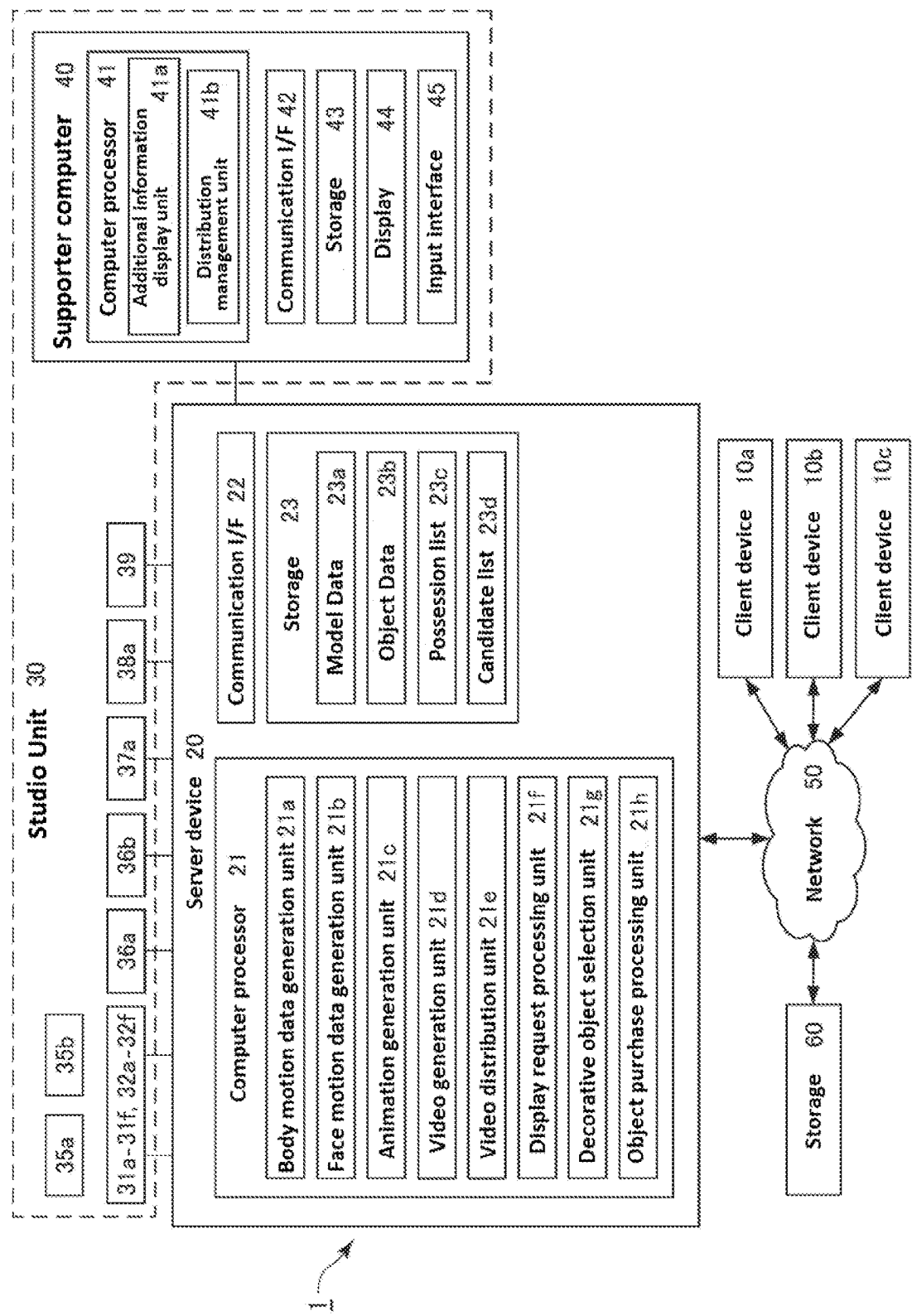
FIG. 1 is a block diagram illustrating a video distribution system according to one embodiment.

Various embodiments of the disclosure will be described hereinafter with reference to the accompanying drawings. Throughout the drawings, the same or similar elements are denoted by the same reference numerals.

Figure 2:
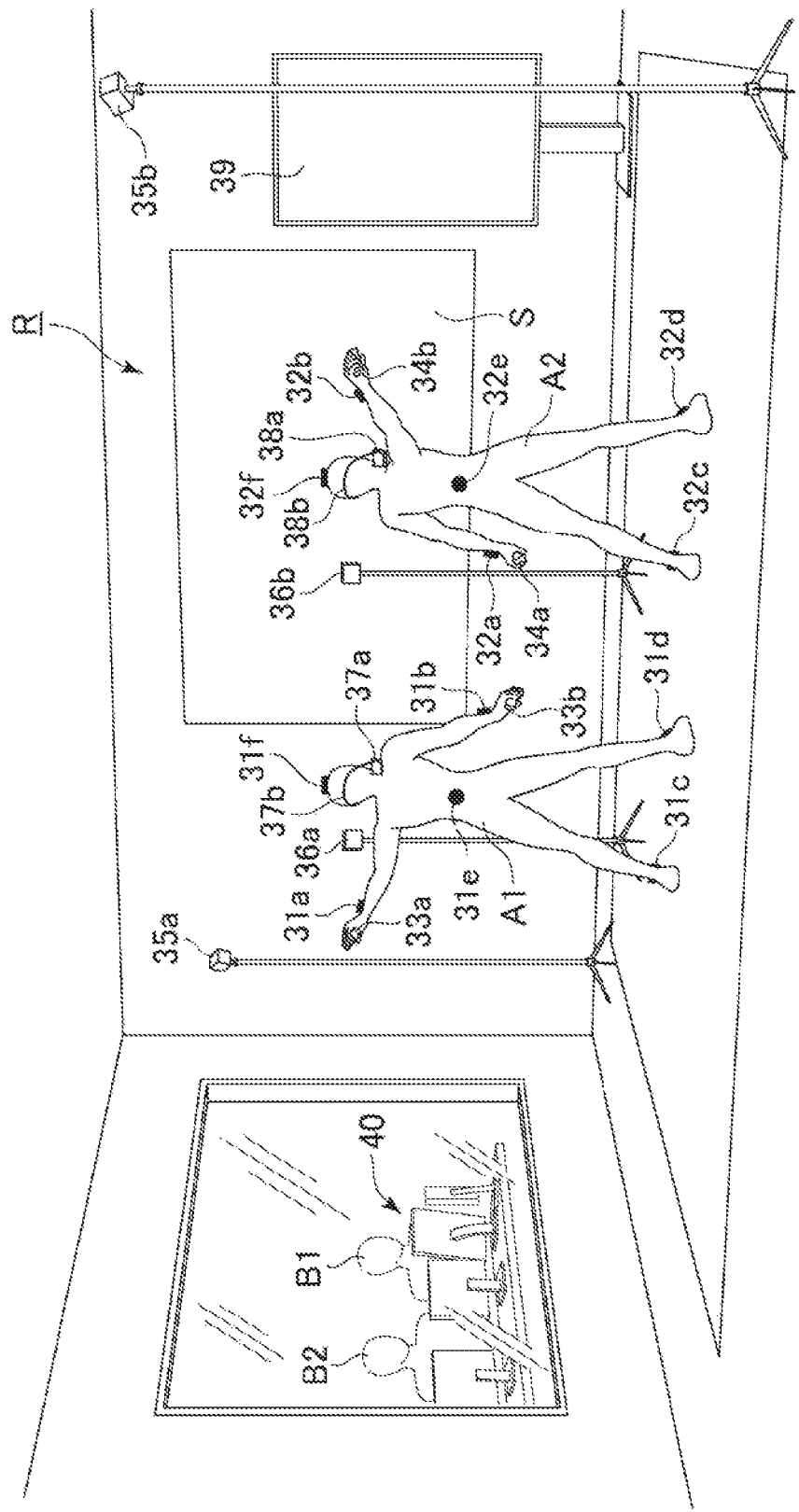
FIG. 2 schematically illustrates a installation of a studio where production of a video that is distributed in the video distribution system of FIG. 1 is performed.

With reference to FIGS. 1 to 4, a video distribution system according to an embodiment will be described. FIG. 1 is a block diagram illustrating a video distribution system 1 according to one embodiment, FIG. 2 schematically illustrates an installation of a studio where a video to be distributed in the video distribution system 1 is produced, and FIGS. 3 to 4 are for describing information stored in the video distribution system 1.

The video distribution system 1 includes client devices 10a to 10c, a server device 20, a studio unit 30, and a storage 60. The client devices 10a to 10c, the server device 20, and the storage 60 are communicably interconnected over a network 50. The server device 20 is configured to distribute a video including an animation of a character, as described later. The character included in the video may be motion controlled in a virtual space.

The video may be distributed from the server device 20 to each of the client devices 10a to 10c. A first viewing user who is a user of the client device 10a, a second viewing user who is a user of the client device 10b, and a third viewing user who is a user of the client device 10c are able to view the distributed video with their client device. The video distribution system 1 may include less than three client devices, or may include more than three client devices. In this specification, when it is not necessary to distinguish the client devices 10a to 10c and other client devices from each other, they may be collectively referred to as "client devices."

The client devices 10a to 10c are information processing devices such as smartphones. In addition to the smartphone, the client devices 10a to 10c each may be a mobile phone, a tablet, a personal computer, an electronic book reader, a wearable computer, a game console, or any other information processing devices that are capable of playing videos. Each of the client devices 10a to 10c may include a computer processor, a memory unit, a communication I/F, a display, a sensor unit including various sensors such as a gyro sensor, a sound collecting device such as a microphone, and a storage for storing various information.

Viewing users are able to input a message regarding the distributed video via an input interface of the client devices 10a to 10c to post the message to the server device 20. The message posted from each viewing user may be displayed such that it is superimposed on the video. In this way, interaction between viewing users is achieved In the illustrated embodiment, the server device 20 includes a computer processor 21, a communication I/F 22, and a storage 23.

The computer processor 21 is a computing device which loads various programs realizing an operating system and various functions from the storage 23 or other storage into a memory unit and executes instructions included in the loaded programs. The computer processor 21 is, for example, a CPU, an MPU, a DSP, a GPU, any other computing device, or a combination thereof. The computer processor 21 may be realized by means of an integrated circuit such as ASIC, PLD, FPGA, MCU, or the like. Although the computer processor 21 is illustrated as a single component in FIG. 1, the computer processor 21 may be a collection of a plurality of physically separate computer processors. In this specification, a program or instructions included in the program that are described as being executed by the computer processor 21 may be executed by a single computer processor or distributed and executed by a plurality of computer processors. Further, a program or instructions included in the program executed by the computer processor 21 may be executed by a plurality of virtual computer processors.

The communication I/F 22 may be implemented as hardware, firmware, or communication software such as a TCP/IP driver or a PPP driver, or a combination thereof. The server device 20 is able to transmit and receive data to and from other devices via the communication I/F 22.

The storage 23 is an storage device accessed by the computer processor 21. The storage 23 is, for example, a magnetic disk, an optical disk, a semiconductor memory, or various other storage device capable of storing data. Various programs may be stored in the storage 23. At least some of the programs and various data that may be stored in the storage 23 may be stored in a storage (for example, a storage 60) that is physically separated from the server device 20.

Most of components of the studio unit 30 are disposed, for example, in a studio room R shown in FIG. 2. As illustrated in FIG. 2, an actor A1 and an actor A2 give performances in the studio room R. The studio unit 30 is configured to detect motions and expressions of the actor A1 and the actor A2, and to output the detection result information to the server device 20.

Both the actor A1 and the actor A2 are objects whose motions and expressions are captured by a sensor group provided in the studio unit 30, which will be described later. The actor A1 and the actor A2 are, for example, humans, animals, or moving objects that give performances. The actor A1 and the actor A2 may be, for example, autonomous robots. The number of actors in the studio room R may be one or three or more.

The studio unit 30 includes six motion sensors 31a to 31f attached to the actor A1, a controller 33a held by the left hand of the actor A1, a controller 33b held by the right hand of the actor A1, and a camera 37a attached to the head of the actor A1 via an attachment 37b. The studio unit 30 also includes six motion sensors 32a to 32f attached to the actor A2, a controller 34a held by the left hand of the actor A2, a controller 34b held by the right hand of the actor A2, and a camera 38a attached to the head of the actor A2 via an attachment 38b. A microphone for collecting audio data may be provided to each of the attachment 37b and the attachment 38b. The microphone can collect speeches of the actor A1 and the actor A2 as voice data. The microphones may be wearable microphones attached to the actor A1 and the actor A2 via the attachment 37b and the attachment 38b. Alternatively the microphones may be installed on the floor, wall or ceiling of the studio room R. In addition to the components described above, the studio unit 30 includes a base station 35a, a base station 35b, a tracking sensor 36a, a tracking sensor 36b, and a display 39. A supporter computer 40 is installed in a room next to the studio room R, and these two rooms are separated from each other by a glass window. The server device 20 may be installed in the same room as the room in which the supporter computer 40 is installed.

The motion sensors 31a to 31f and the motion sensors 32a to 32f cooperate with the base station 35a and the base station 35b to detect their position and orientation. In one embodiment, the base station 35a and the base station 35b are multi-axis laser emitters. The base station 35a emits flashing light for synchronization and then emits a laser beam about, for example, a vertical axis for scanning. The base station 35a emits a laser beam about, for example, a horizontal axis for scanning. Each of the motion sensors 31a to 31f and the motion sensors 32a to 32f may be provided with a plurality of optical sensors for detecting incidence of the flashing lights and the laser beams from the base station 35a and the base station 35b, respectively. The motion sensors 31a to 31f and the motion sensors 32a to 32f each may detect a time difference between an incident timing of the flashing light and an incident timing of the laser beam, time when each optical sensor receives the light and or beam, an incident angle of the laser light detected by each optical sensor, and any other information as necessary. The motion sensors 31a to 31f and the motion sensors 32a to 32f may be, for example, Vive Trackers provided by HTC CORPORATION. The base station 35a and the base station 35b may be, for example, base stations provided by HTC CORPORATION. Three or more base stations may be provided. The position of the base station may be changed as appropriate. For example, in addition to or instead of the base station disposed at the upper corner of the space to be detected by the tracking sensor, a pair of the base stations may be disposed at a upper position and a lower position close to the floor.

Detection information (hereinafter may also be referred to as "tracking information") obtained as a result of detection performed by each of the motion sensors 31a to 31f and the motion sensors 32a to 32f is transmitted to the server device 20. The detection result information may be wirelessly transmitted to the server device 20 from each of the motion sensors 31a to 31f and the motion sensors 32a to 32f. Since the base station 35a and the base station 35b emit flashing light and a laser light for scanning at regular intervals, the tracking information of each motion sensor is updated at each interval. The position and the orientation of each of the motion sensors 31a to 31f and the motion sensors 32a to 32f may be calculated based on the tracking information detected by the motion sensors 31a to 31f and the motion sensors 32a to 32f. The position and the orientation of each of the motion sensors 31a to 31f and the motion sensors 32a to 32f may be calculated based on, for example, the tracking information in the server device 20.

In the illustrated embodiment, the six motion sensors 31a to 31f are mounted on the actor A. The motion sensors 31a, 31b, 31c, 31d, 31e, and 31f are attached to the left wrist, the right wrist, the left instep, the right instep, the hip, and top of the head of the actor A1, respectively. The motion sensors 31a to 31f may each be attached to the actor A1 via an attachment. The six motion sensors 32a to 32f are mounted on the actor A2. The motion sensors 32a to 32f may be attached to the actor A2 at the same positions as the motion sensors 31a to 31f. The motion sensors 31a to 31f and the motion sensors 32a to 32f shown in FIG. 2 are merely an example. The motion sensors 31a to 31f may be attached to various parts of the body of the actor A1, and the motion sensors 32a to 32f may be attached to various parts of the body of the actor A2. The number of motion sensors attached to the actor A1 and the actor A2 may be less than or more than six. As described above, body movements of the actor A1 and the actor A2 are detected by detecting the position and the orientation of the motion sensors 31a to 31f and the motion sensors 32a to 32f attached to the body parts of the actor A1 and the actor A2.

In one embodiment, a plurality of infrared LEDs are mounted on each of the motion sensors attached to the actor A1 and the actor A2, and light from the infrared LEDs are sensed by infrared cameras provided on the floor and/or wall of the studio room R to detect the position and the orientation of each of the motion sensors. Visible light LEDs may be used instead of the infrared LEDs, and in this case light from the visible light LEDs may be sensed by visible light cameras to detect the position and the orientation of each of the motion sensors. As described above, a light emitting unit (for example, the infrared LED or visible light LED) may be provided in each of the plurality of motion sensors attached to the actor, and a light receiving unit (for example, the infrared camera or visible light camera) provided in the studio room R senses the light from the light emitting unit to detect the position and the orientation of each of the motion sensors.

In one embodiment, a plurality of reflective markers may be used instead of the motion sensors 31a-31f and the motion sensors 32a-32f. The reflective markers may be attached to the actor A1 and the actor A2 using an adhesive tape or the like. The position and orientation of each reflective marker can be estimated by capturing images of the actor A1 and the actor A2 to which the reflective markers are attached to generate captured image data and performing image processing on the captured image data.

The controller 33a and the controller 33b supply, to the server device 20, control signals that correspond to operation of the actor A1. Similarly, the controller 34a and the controller 34b supply, to the server device 20, control signals that correspond to operation of the actor A2.

The tracking sensor 36a and the tracking sensor 36b generate tracking information for determining configuration information of a virtual camera used for constructing a virtual space included in the video. The tracking information of the tracking sensor 36a and the tracking sensor 36b is calculated as the position in its three-dimensional orthogonal coordinate system and the angle around each axis. The position and orientation of the tracking sensor 36a may be changed according to operation of the operator. The tracking sensor 36a transmits the tracking information indicating the position and the orientation of the tracking sensor 36a to the tracking information server device 20. Similarly, the position and the orientation of the tracking sensor 36b may be set according to operation of the operator. The tracking sensor 36b transmits the tracking information indicating the position and the orientation of the tracking sensor 36b to the tracking information server device 20. The tracking sensors 36a, 36b each may be supported by a gimbal or stabilizer. The gimbal may be configured to be graspable by an actor or a supporter. By supporting the tracking sensors 36a and 36b with the gimbals or stabilizers, it is possible to suppress camera shake.

The camera 37a is attached to the head of the actor A1 as described above. For example, the camera 37a is disposed so as to capture an image of the face of the actor A1. The camera 37a continuously captures images of the face of the actor A1 to obtain imaging data of the face of the actor A1. Similarly, the camera 38a is attached to the head of the actor A2. The camera 38a is disposed so as to capture an image of the face of the actor A2 and continuously capture images of the face of the actor A2 to obtain captured image data of the face of the actor A2. The camera 37a transmits the captured image data of the face of the actor A1 to the server device 20, and the camera 38a transmits the captured image data of the face of the actor A2 to the server device 20. The camera 37a and the camera 38a may be 3D cameras capable of detecting the depth of a face of a person.

The display 39 is configured to display information received from the supporter computer 40. The information transmitted from the supporter computer 40 to the display 39 may include, for example, text information, image information, and various other information. The display 39 is disposed at a position where the actor A1 and the actor A2 are able to see the display 39. The display 39 is an example of a first display device.

In the illustrated embodiment, the supporter computer 40 is installed in the next room of the studio room R. Since the room in which the supporter computer 40 is installed and the studio room R are separated by the glass window, an operator of the supporter computer 40 (sometimes referred to as "supporter" in the specification) is able to see the actor A1 and the actor A2. In the illustrated embodiment, supporters B1 and B2 are present in the room as the operators of the supporter computer 40. In the specification, the supporter B1 and the supporter B2 may be collectively referred to as the "supporter" when it is not necessary to distinguish them from each other.

The supporter computer 40 may be configured to be capable of changing the setting(s) of the component(s) of the studio unit 30 according to the operation by the supporter B1 and the supporter B2. The supporter computer 40 can change, for example, the setting of the scanning interval performed by the base station 35a and the base station 35b, the position or orientation of the tracking sensor 36a and the tracking sensor 36b, and various settings of other devices. At least one of the supporter B1 and the supporter B2 is able to input a message to the supporter computer 40, and the input message is displayed on the display 39.

The components and functions of the studio unit 30 shown in FIG. 2 are merely example. The studio unit 30 applicable to the invention may include various constituent elements that are not shown. For example, the studio unit 30 may include a projector. The projector is able to project a video distributed to the client device 10a or another client device on the screen S.

Next, information stored in the storage 23 in one embodiment will be described. In the illustrated embodiment, the storage 23 stores model data 23a, object data 23b, a possession list 23c, a candidate list 23c and any other information required for generation and distribution of a video to be distributed The model data 23a is model data for generating animation of a character. The model data 23a may be three-dimensional model data for generating three-dimensional animation, or may be two-dimensional model data for generating two-dimensional animation. The model data 23a includes, for example, rig data (also referred to as "skeleton data") indicating a skeleton of a character, and surface data indicating the shape or texture of a surface of the character. The model data 23a may include two or more different pieces of model data. Pieces of model data may each have different rig data, or may have the same rig data. The pieces of model data may have surface data different from each other or may have the same surface data. In the illustrated embodiment, in order to generate a character object corresponding to the actor A1 and a character object corresponding to the actor A2, the model data 23a includes at least two types of model data different from each other. The model data for the character object corresponding to the actor A1 and the model data for the character object corresponding to the actor A2 may have, for example, the same rig data but different surface data from each other.

The object data 23b includes asset data used for constructing a virtual space in the video. The object data 23b includes data for rendering a background of the virtual space in the video, data for rendering various objects displayed in the video, and data for rendering any other objects displayed in the video. The object data 23a may include object position information indicating the position of an object in the virtual space.

In addition to the above, the object data 23b may include a gift object displayed in the video in response to a display request from viewing users of the client devices 10a to 10c. The gift object may include an effect object, a normal object, and a decorative object. Viewing users are able to purchase a desired gift object. Moreover, an upper limit may be set for the number of objects that a viewing user is allowed to purchase or the amount of money that the viewing user is allowed to spend for objects.

The effect object is an object that affects the impression of the entire viewing screen of the distributed video, and is, for example, an object representing confetti. The object representing confetti may be displayed on the entire viewing screen, which can change the impression of the entire viewing screen before and after its display. The effect object may be displayed so as to overlap with the character object, but it is different from the decorative object in that it is not displayed in association with a specific portion of the character object.

The normal object is an object functioning as a digital gift from a viewing user (for example, the actor A1 or the actor A2) to an actor, for example, an object resembling a stuffed toy or a bouquet. In one embodiment, the normal object is displayed on the display screen of the video such that it does not contact the character object. In one embodiment, the normal object is displayed on the display screen of the video such that it does not overlap with the character object. The normal object may be displayed in the virtual space such that it overlaps with an object other than the character object. The normal object may be displayed so as to overlap with the character object, but it is different from the decorative object in that it is not displayed in association with a specific portion of the character object. In one embodiment, when the normal object is displayed such that it overlaps with the character object, the normal object may hide portions of the character object other than the head including the face of the character object but does not hide the head of the character object.

The decorative object is an object displayed on the display screen in association with a specific part of the character object. In one embodiment, the decorative object displayed on the display screen in association with a specific part of the character object is displayed adjacent to the specific part of the character object on the display screen. In one embodiment, the decorative object displayed on the display screen in association with a specific part of the character object is displayed such that it partially or entirely covers the specific part of the character object on the display screen.

The decorative object is an object that can be attached to a character object, for example, an accessory (such as a headband, a necklace, an earring, etc.), clothes (such as a T-shirt), a costume, and any other object which can be attached to the character object. The object data 23b corresponding to the decorative object may include attachment position information indicating which part of the character object the decorative object is associated with. The attachment position information of a decorative object may indicate to which part of the character object the decorative object is attached. For example, when the decorative object is a headband, the attachment position information of the decorative object may indicate that the decorative object is attached to the "head" of the character object. When the decorative object is a T-shirt, the attachment position information of the decorative object may indicate that the decorative object is attached to the "torso" of the character object.

A duration of time of displaying the gift objects may be set for each gift object depending on its type. In one embodiment, the duration of displaying the decorative object may be set longer than the duration of displaying the effect object and the duration of displaying the normal object. For example, the duration of displaying the decorative object may be set to 60 seconds, while the duration of displaying the effect object may be set to five seconds and the duration of displaying the normal object may be set to ten seconds.

The possession list 23c is a list showing gift objects possessed by viewing users of a video. An example of the possession list 23c is shown in FIG. 3. As illustrated, in the possession list 23c, an object ID for identifying a gift object possessed by a viewing user is stored in association with account information of the viewing user (for example, user ID of the viewing user). The viewing users include, for example, the first to third viewing users of the client devices 10a to 10c.

The candidate list 23d is a list of decorative objects for which a display request has been made from a viewing user. As will be described later, a viewing user who holds a decorative object(s) is able to make a request to display his/her possessed decorative objects. In the candidate list 23d, object IDs for identifying decorative objects are stored in association with the account information of the viewing user who has made a request to display the decorative objects. The candidate list 23d may be created for each distributor. The candidate list 23d may be stored, for example, in association with distributor identification information that identify a distributor(s) (the actor A1, the actor A2, the supporter B1, and/or the supporter B2).

Functions realized by the computer processor 21 will be now described more specifically. The computer processor 21 functions as a body motion data generation unit 21a, a face motion data generation unit 21b, an animation generation unit 21c, a video generation unit 21d, a video distribution unit 21e, a display request processing unit 21f, a decorative object selection unit 21g, and an object purchase processing unit 21h by executing computer-readable instructions included in a distributed program. At least some of the functions that can be realized by the computer processor 21 may be realized by a computer processor other than the computer processor 21 of the video distribution system 1. For example, at least some of the functions realized by the computer processor 21 may be realized by a computer processor mounted on the supporter computer 40.

The body motion data generation unit 21a generates first body motion data of each part of the body of the actor A1 based on the tracking information obtained through detection performed by the corresponding motion sensors 31a to 31f, and generates second body motion data, which is a digital representation of the position and the orientation of each part of the body of the actor A2, based on the tracking information obtained through detection performed by the corresponding motion sensors 32a to 32f. In the specification, the first body motion data and the second body motion data may be collectively referred to simply as "body motion data." The body motion data is serially generated with time as needed. For example, the body motion data may be generated at predetermined sampling time intervals. Thus, the body motion data can represent body movements of the actor A1 and the actor A2 in time series as digital data. In the illustrated embodiment, the motion sensors 31a to 31f and the motion sensors 32a to 32f are attached to the left and right limbs, the waist, and the head of the actor A1 and the actor A2, respectively. Based on the tracking information obtained through detection performed by the motion sensors 31a to 31f and the motion sensors 32a to 32f, it is possible to digitally represent the position and orientation of the substantially whole body of the actor A1 and the actor A2 in time series. The body motion data can define, for example, the position and rotation angle of bones corresponding to the rig data included in the model data 23a.

The face motion data generation unit 21b generates first face motion data, which is a digital representation of motions of the face of the actor A1, based on captured image data of the camera 37a, and generates second face motion data, which is a digital representation of motions of the face of the actor A2, based on captured image data of the camera 38a. In the specification, the first face motion data and the second face motion data may be collectively referred to simply as "face motion data." The face motion data is serially generated with time as needed. For example, the face motion data may be generated at predetermined sampling time intervals. Thus, the face motion data can digitally represent facial motions (changes in facial expression) of the actor A1 and the actor A2 in time series.

The animation generation unit 21c is configured to apply the body motion data generated by the body motion data generation unit 21a and the face motion data generated by the face motion data generation unit 21b to predetermined model data included in the model data 23a in order to generate an animation of a character object that moves in a virtual space and whose facial expression changes. More specifically, the animation generation unit 21c may generate an animation of a character object moving in synchronization with the motions of the body and facial expression of the actor A1 based on the first body motion data and the first face motion data related to the actor A1, and generate an animation of a character object moving in synchronization with the motions of the body and facial expression of the actor A2 based on the second body motion data and the second face motion data related to the actor A2. In the specification, a character object generated based on the motion and expression of the actor A1 may be referred to as a "first character object", and a character object generated based on the motion and expression of the actor A2 may be referred to as a "second character object."

The video generation unit 21d constructs a virtual space using the object data 23b, and generates a video that includes the virtual space, the animation of the first character object corresponding to the actor A1, and the animation of the second character object corresponding to the actor A2. The first character object is disposed in the virtual space so as to correspond to the position of the actor A1 with respect to the tracking sensor 36a, and the second character object is disposed in the virtual space so as to corresponds to the position of the actor A2 with respect to the tracking sensor 36a. Thus, it is possible to change the position and the orientation of the first character object and the second character object in the virtual space by changing the position or the orientation of the tracking sensor 36a.

In one embodiment, the video generation unit 21d constructs a virtual space based on tracking information of the tracking sensor 36a. For example, the video generation unit 21d determines configuration information (the position in the virtual space, a gaze position, a gazing direction, and the angle of view) of the virtual camera based on the tracking information of the tracking sensor 36a. Moreover, the video generation unit 21d determines a rendering area in the entire virtual space based on the configuration information of the virtual camera and generates moving image information for displaying the rendering area in the virtual space.

The video generation unit 21d may be configured to determine the position and the orientation of the first character object and the second character object in the virtual space, and the configuration information of the virtual camera based on tracking information of the tracking sensor 36b instead of or in addition to the tracking information of the tracking sensor 36a.

The video generation unit 21d is able to include voices of the actor A1 and the actor A2 collected by the microphone in the studio unit 30 with the generated moving image.

As described above, the video generation unit 21d generates an animation of the first character object moving in synchronization with the movement of the body and facial expression of the actor A1, and an animation of the second character moving in synchronization with the movement of the body and facial expression of the actor A2. The video generation unit 21d then includes the voices of the actor A1 and the actor A2 with the animations respectively to generate a video for distribution.

The video distribution unit 21e distributes the video generated by the video generation unit 21d The video is distributed to the client devices 10a to 10c and other client devices over the network 50. The video distribution unit 21e refers to the list of users who have requested distribution of the video (a distribution destination list), and distributes the video to the client devices of the users included in the list. As will be described later, there may be a case where distribution of the video to a specific user is prohibited by an instruction from the supporter computer 40. In this case, the video is distributed to users other than the user to whom distribution of the video is prohibited The received video is reproduced in the client devices 10a to 10c.

The video may be distributed to a client device (not shown) installed in the studio room R, and projected from the client device onto the screen S via a short focus projector. The video may also be distributed to the supporter computer 40. In this way, the supporter B1 and the supporter B2 can check the viewing screen of the distributed video.

Figure 5:
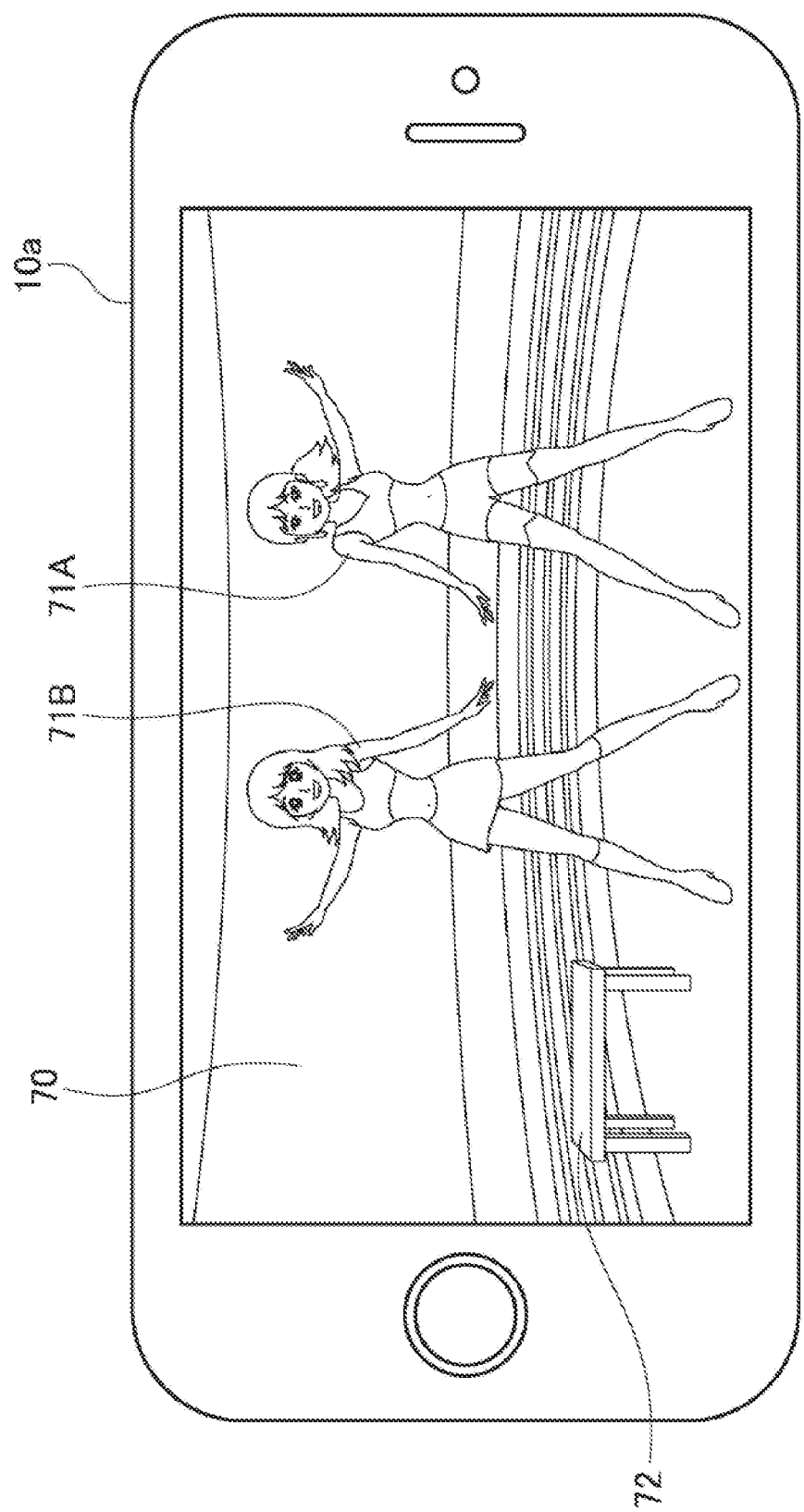
FIG. 5 illustrates an example of a video displayed on the client device 10a in one embodiment. An animation of a character object is included in FIG. 5.
Figure 7:
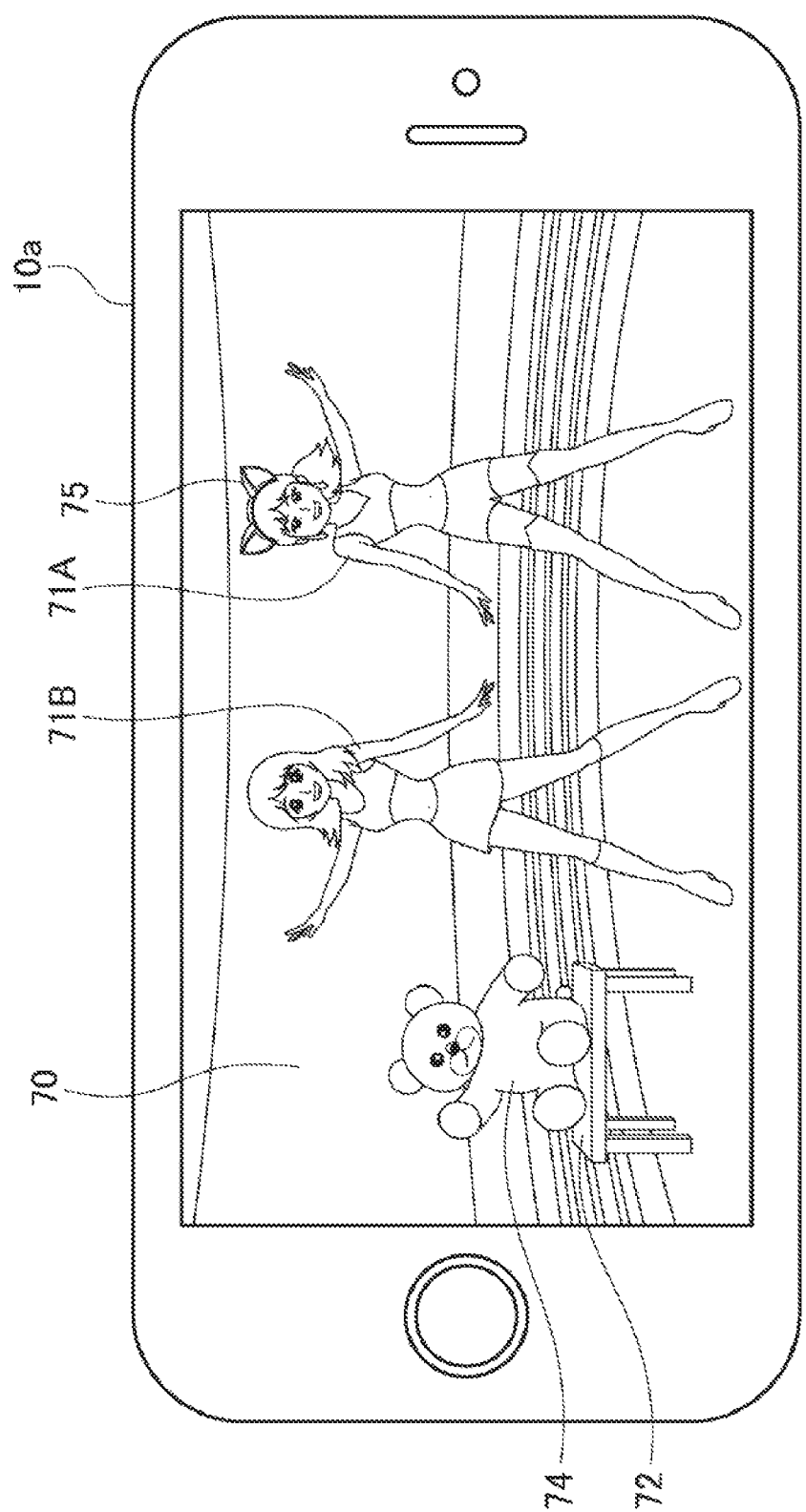
FIG. 7 illustrates an example of a video displayed on the client device 10a in one embodiment. A decorative object is included in FIG. 7.

An example of the screen on which the video distributed from the server device 20 to the client device 10a and reproduced by the client device 10a is displayed is illustrated in FIG. 5. As shown in FIG. 7, a display image 70 of the video distributed from the server device 20 is displayed on the display of the client device 10a. The display image 70 displayed on the client device 10a includes a character object 71A corresponding to the actor A1, a character object 71B corresponding to the actor A2, a table object 72a representing a table, in a virtual space. The object 72 is not a gift object, but is one of objects used for constructing a virtual space included in the object data 23b. The character object 71A is generated by applying the first body motion data and the first face motion data of the actor A1 to the model data for the actor A1 included in the model data 23a. The character object 71A is motion controlled based on the first body motion data and the first face motion data. The character object 71B is generated by applying the second body motion data and the second face motion data of the actor A2 to the model data for the actor A2 included in the model data 23a. The character object 71B is motion controlled based on the second body motion data and the second face motion data. Thus, the character object 71A is controlled to move in the screen in synchronization with the motions of the body and facial expression of the actor A1, and the character object 71B is controlled to move in the screen in synchronization with the motions of the body and facial expression of the actor A2.

As described above, the video from the server device 20 may be distributed to the supporter computer 40. The video distributed to the supporter computer 40 is displayed on the supporter computer 40 in the same manner as FIG. 5. The supporter B1 and the supporter B2 are able to change the configurations of the components of the studio unit 30 while viewing the video reproduced by the supporter computer 40. In one embodiment, when the supporter B1 and the supporter B2 wish to change the angle of the character object 71A and the character object 71B in the live distributed video, they can cause an instruction signal to change the orientation of the tracking sensor 36a to be sent from the supporter computer 40 to the tracking sensor 36a. The tracking sensor 36a is able to change its orientation in accordance with the instruction signal For example, the tracking sensor 36a may be rotatably attached to a stand via a pivoting mechanism that includes an actuator disposed around the axis of the stand. When the tracking sensor 36a received an instruction signal instructing to change its orientation, the actuator of the pivoting mechanism may be driven based on the instruction signal, and the tracking sensor 36a may be turned by an angle according to the instruction signal In one embodiment, the supporter B1 and the supporter B2 may cause the supporter computer 40 to transmit an instruction for using the tracking information of the tracking sensor 36b to the tracking sensor 36a and the tracking sensor 36b, instead of the tracking information from the tracking sensor 36a. The tracking sensor 36a and the tracking sensor 36b may be configured and installed so as to be movable the actor or supporter. As a result, the actor or supporter can hold and move the tracking sensor 36a and the tracking sensor 36b.

In one embodiment, when the supporter B1 and the supporter B2 determine that some instructions are needed for the actor A1 or the actor A2 as they viewing the video reproduced on the supporter computer 40, they may input a message indicating the instruction(s) into the supporter computer 40 and the message may be output to the display 39. For example, the supporter B1 and the supporter B2 can instruct the actor A1 or the actor A2 to change his/her standing position through the message displayed on the display 39.

The display request processing unit 21f receives a display request to display a gift object from a client device of a viewing user, and performs processing according to the display request. Each viewing user is able to transmit a display request to display a gift object to the server device 20 by operating his/her client device. For example, the first viewing user can transmit a display request to display a gift object to the server device 20 by operating the client device 10a. The display request to display a gift object may include the user ID of the viewing user and the identification information (object ID) that identifies the object for which the display request is made.

As described above, the gift object may include the effect object, the normal object, and the decorative object. The effect object and the normal object are examples of the first object. In addition, a display request for requesting display of the effect object or the normal object is an example of a second display request.

Figure 6:
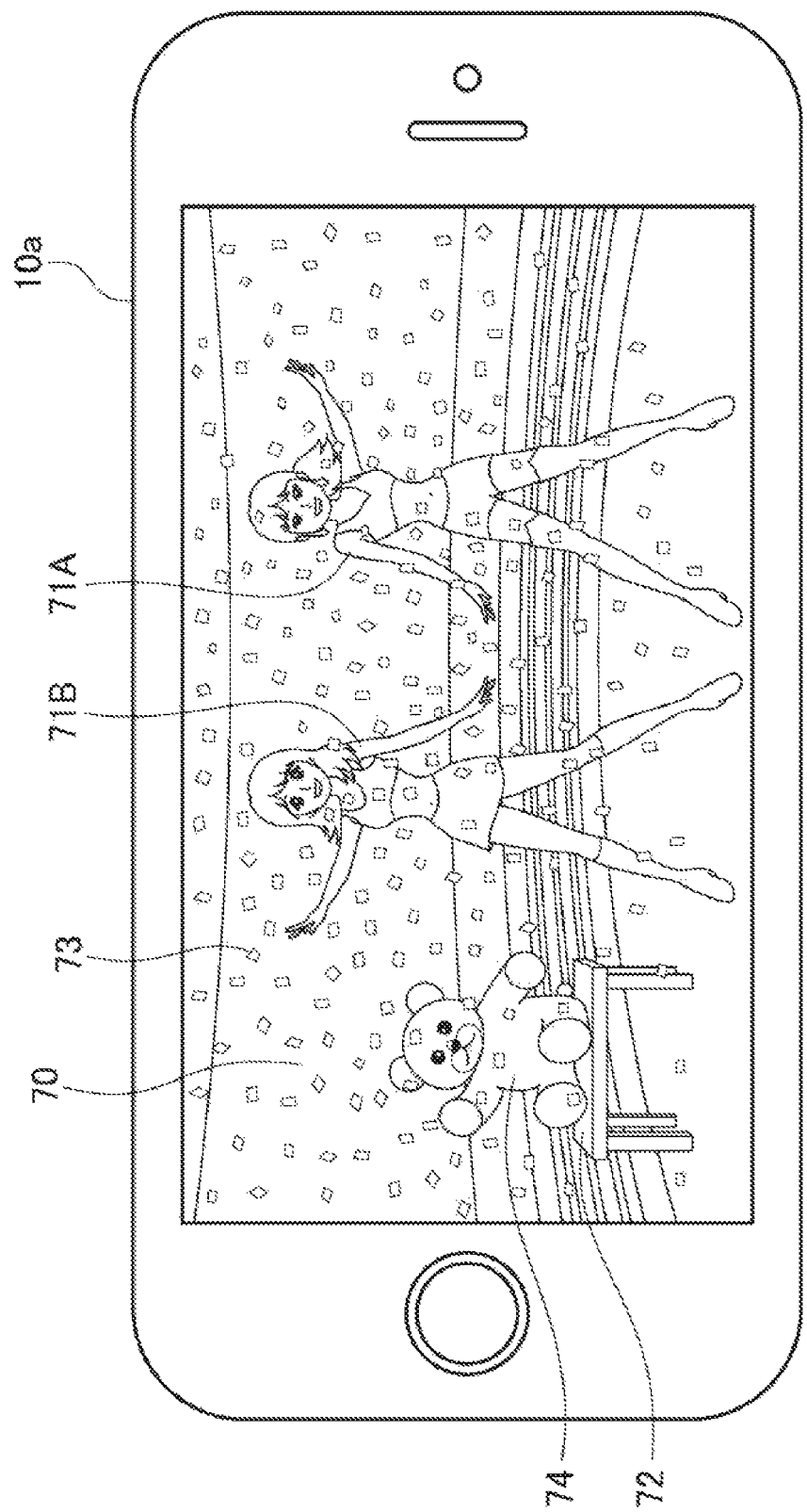
FIG. 6 illustrates an example of a video displayed on the client device 10a in one embodiment. A normal object is included in FIG. 6.

In one embodiment, when the display request processing unit 21f received a display request to display a specific effect object from a viewing user, the display request processing unit 21f performs a process, in response to the display request, to display the effect object for which the display request is made in the display image 70 of the video. For example, when a display request to display an effect object simulating confetti is made, the display request processing unit 21f displays in the display image 70 an effect object 73 simulating confetti based on the display request as shown in FIG. 6.

In one embodiment, when the display request processing unit 21f received a display request to display a specific normal object from a viewing user, the display request processing unit 21f performs a process, in response to the display request, to display the normal object for which the display request is made in the video 70. For example, when a display request to display a normal object simulating a stuffed bear is made, the display request processing unit 21f displays a normal object 74 simulating a stuffed bear in the display image 70 based on the display request as shown in FIG. 6.

The display request for the normal object 74 may include a display position specifying parameter for specifying the display position of the normal object 74 in the virtual space. In this case, the display request processing unit 21f displays the normal object 74 at the position specified by the display position specifying parameter in the virtual space. For example, the display position specifying parameter may specify the upper position of the table object 72a representing a table as the display position of the normal object 74. A viewing user is able to specify the position where the normal object is to be displayed by using the display position specifying parameter while watching the layouts of the character object 71A, the character object 71B, the gift object, and other objects included in the video 70.

In one embodiment, the normal object 74 may be displayed such that it moves within the display image 70 of the video. For example, the normal object 74 may be displayed such that it falls from the top to the bottom of the screen. In this case, the normal object 74 may be displayed in the display image 70 during the fall, which is from when the object starts to fall and to when the object has fallen to the floor of the virtual space of the video 70, and may disappear from the display image 70 after it has fallen to the floor. A viewing user can view the falling normal object 74 from the start of the fall to the end of the fall. The moving direction of the normal object 74 in the screen can be specified as desired. For example, the normal object 74 may be displayed in the display image 70 so as to move from the left to the right, the right to the left, the upper left to the lower left, or any other direction of the video 70. The normal object 74 may move on various paths. For example, the normal object 74 can move on a linear path, a circular path, an elliptical path, a spiral path, or any other paths. The viewing user may include, in the display request to display the normal object, a moving direction parameter that specifies the moving direction of the normal object 74 and/or a path parameter that specifies the path on which the normal object 74 moves, in addition to or in place of the display position specifying parameter. In one embodiment, among the effect objects and the normal objects, those whose size in the virtual space is smaller than a reference size (for example, a piece of paper of confetti of the effect object 73) may be displayed such that a part or all of the object(s) is overlapped with the character object 71A and/or the character object 71B. In one embodiment, among the effect objects and the normal objects, those whose size in the virtual space is larger than the reference size (for example, the normal object 74 (the stuffed bear)) may be displayed at a position where the object is not overlapped with the character object. In one embodiment, among the effect objects and the normal objects, if those whose size in the virtual space is larger than the reference size (for example, the normal object 74 (the stuffed bear)) is overlapped with the character object 71A and/or the character object 71B, the object is displayed behind the overlapping character object.

In one embodiment, when the display request processing unit 21f received a display request to display a specific decorative object from a viewing user, the display request processing unit 21f adds the decorative object for which the display request is made to the candidate list 23d based on the display request. The display request to display the decorative object is an example of a first display request. For example, the display request processing unit 21f may store identification information (object ID) identifying the specific decorative object for which the display request has been made from the viewing user in the candidate list 23d in association with the user ID of the viewing user (see FIG. 4). When more than one display request to display a decorative object is made, for each of the display requests, the user ID of the viewing user who made the display request and the decorative object ID of the decoration object for which the display request is made by the viewing user are associated with each other and stored in the candidate list 23d.

In one embodiment, in response to one or more of the decorative objects included in the candidate list 23d being selected, the decorative object selection unit 21g performs a process to display the selected decorative object in the display image 70 of the video. In the specification, a decorative object selected from the candidate list 23d may be referred to as a "selected decorative object."

Figure 8:
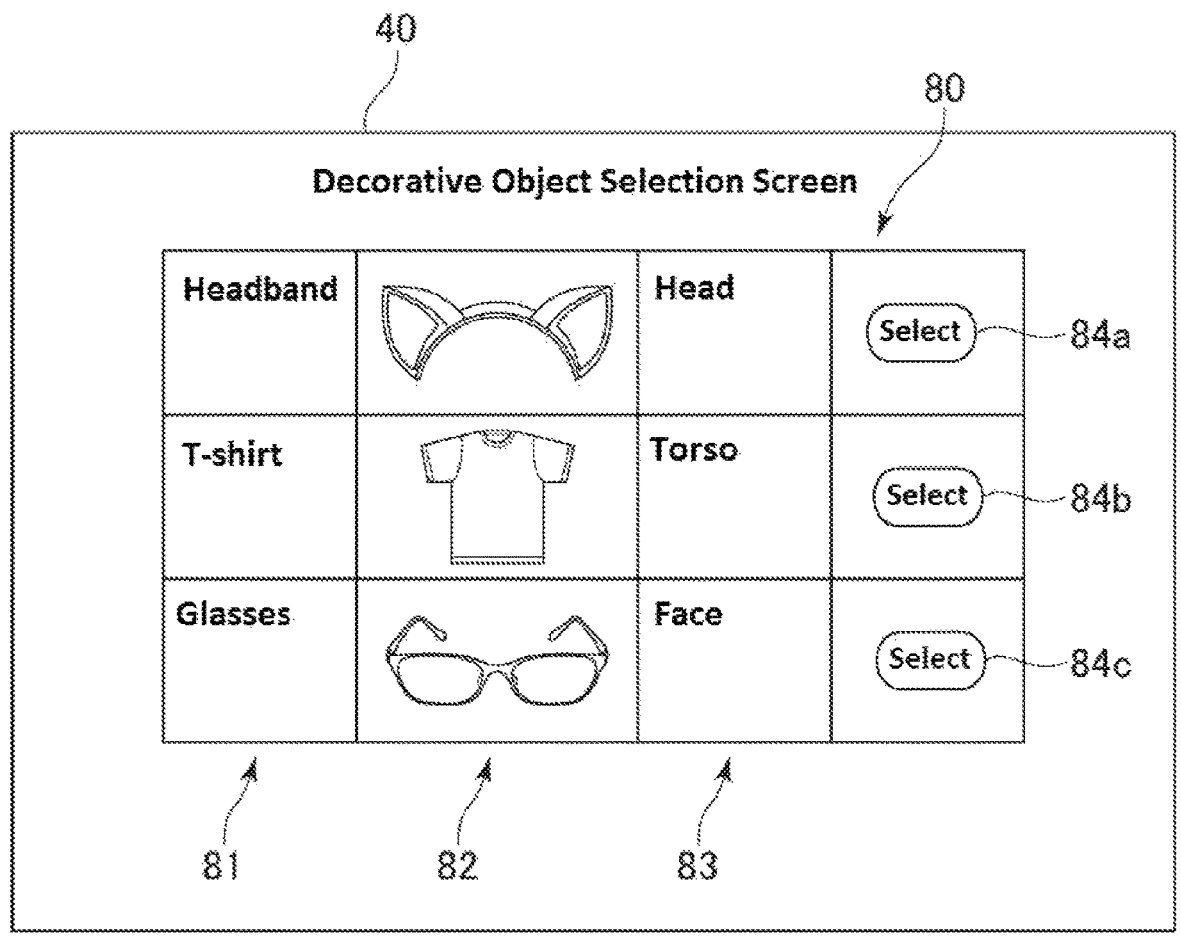
FIG. 8 schematically illustrates an example of a decorative object selection screen for selecting a desired decorative object from among the decorative objects included in the candidate list.

The selection of the decoration object from the candidate list 23d is made, for example, by the supporter B1 and/or the supporter B2 who operate the supporter computer 40. In one embodiment, the supporter computer 40 displays a decorative object selection screen. FIG. 8 shows an example of a decorative object selection screen 80 in one embodiment. The decorative object selection screen 80 is displayed, for example, on the display of the supporter computer 40. The decorative object selection screen 80 shows, for example, each of the plurality of decoration objects included in the candidate list 23d in a tabular form. As illustrated, the decorative object selection screen 80 in one embodiment includes a first column 81 showing the type of the decoration object, a second column 82 showing the image of the decoration object, and a third column 83 showing the body part of a character object associated with the decoration object. Further, on the decorative object selection screen 80, selection buttons 84a to 84c for selecting each decoration object are displayed. Thus, the decorative object selection screen 80 displays decorative objects that can be selected as the selected decorative object.

The supporters B1 and B2 are able to select one or more of the decorative objects shown on the decoration object selection screen 80. For example, the supporter B1 and the supporter B2 are able to select a headband by selecting the selection button 84a. When it is detected by the decorative object selection unit 21g that the headband is selected, the display request processing unit 21f displays the selected decorative object 75 that simulates the selected headband on the display screen 70 of the video, as shown in FIG. 7. The selected decorative object 75 is displayed on the display image 70 in association with a specific body part of a character object. The selected decorative object 75 may be displayed such that it contacts with the specific body part of the character object. For example, since the selected decorative object 75 simulating the headband is associated with the head of the character object, it is attached to the head of the character object 71A as shown in FIG. 7. The decorative object may be displayed on the display screen 70 such that it moves along with the motion of the specific part of the character object. For example, when the head of the character object 71A with the headband moves, the selected decorative object 75 simulating the headband moves in accordance with the motion of the head of the character object 71A as if the headband is attached to the head of the character object 71A.

The selected decorative object 75 may be displayed on the display screen 70 in association with the character object 71B instead of the character object 71A. Alternatively, the selected decorative object 75 may be displayed on the display screen 70 in association with the character object 71A and the character object 71B.

In one embodiment, the decorative object selection screen 80 may be configured to exclude information identifying a user who holds the decorative object or a user who has made a display request to display the decorative object. By configuring the decorative object selection screen 80 in this manner, it is possible to prevent a selector from giving preference to a particular user when selecting a decorative object.

In one embodiment, the decorative object selection screen 80 may display, for each decorative object, information regarding a user who holds the decorative object or a user who made a display request for the decorative object. Such information displayed for each decorative object may include, for example, the number of times that the user who made this display request of the decorative object has made display requests of the decorative object so far and the number of times that the decorative object has been actually selected (for example, information indicating that the display request to display the decorative object has been made five times and the decorative object has been selected two times among the five times), the number of times that the user views the video of the character object 71A and/or the character object 71B, the number of times that the user views a video (regardless of whether the character object 71A and/or the character object 71B appears in the video or not), the amount of money which the user spent for the gift object, the number of times that the user purchases the object, the points possessed by the user that can be used in the video distribution system 1, the level of the user in the video distribution system 1, and any other information about the user who made the display request to display the respective decorative object may be displayed. According to this embodiment, it is possible to select the decorative object based on the behavior and/or the viewing history of the user who has made the display request of the decorative object in the video distribution system 1.

In one embodiment, a constraint(s) may be imposed on the display of decorative objects to eliminate overlapping. For example, with regard to the character object 71A, if a decorative object associated with the specific body part of the character object is already selected, selection of other decorative objects associated with the specific body part may be prohibited As shown in the embodiment of FIG. 7, when the headband associated with the "head" of the character object 71B is already selected, the other decorative objects associated with the "head" (for example, a decorative object simulating a "hat" associated with the head) are not displayed on the decorative object selection screen 80, or a selection button for selecting the decorative object simulating the hat is made unselectable on decorative object selection screen 80. According to this embodiment, it is possible to prevent the decorative object from being displayed so as to overlap with a specific part of the character object.

The decorative object selection screen 80 may be displayed on another device instead of or in addition to the supporter computer 40. For example, the decorative object selection screen 80 may be displayed on the display 39 and/or the screen S in the studio room R. In this case, the actor A1 and the actor A2 are able to select a desired decorative object based on the decorative object selection screen 80 displayed on the display 39 or the screen S. Selection of the decorative object by the actor A1 and the actor A2 maybe made, for example, by operating the controller 33a, the controller 33b, the controller 34a, or the controller 34b.

In one embodiment, in response to a request from a viewing user of the video, the object purchase processing unit 21h transmits, to a client device of the viewing user (for example, the client device 10a), purchase information of each of the plurality of gift objects that can be purchased in relation to the video. The purchase information of each gift object may include the type of the gift object (the effect object, the normal object, or the decorative object), the image of the gift object, the price of the gift object, and any other information necessary to purchase the gift object. The viewing user is able to select a gift object to purchase it considering the gift object purchase information displayed on the client device 10a. The selection of the gift objects which the viewing user purchases may be performed by operating the client device 10a. When a gift object to be purchased is selected by the viewing user, a purchase request for the gift object is transmitted to the server device 20. The object purchase processing unit 21h performs a payment process based on the purchase request. When the payment process is completed, the purchased gift object is held by the viewing user. In this case, the object ID of the purchased gift object is stored in the possession list 23c in association with the user ID of the viewing user who purchased the object.

Gift objects that can be purchased may be different for each video. The gift objects may be made purchasable in two or more different videos. That is, the purchasable gift objects may include a gift object unique to each video and a common gift object that can be purchased in the videos. For example, the effect object that simulates confetti may be the common gift object that can be purchased in the two or more different videos.

In one embodiment, when a user purchases an effect object while viewing a video, the purchased effect object may be displayed automatically in the video that the user is viewing in response to completion of the payment process to purchase the effect object. In the same manner, when a user purchases a normal object while viewing a video, the purchased normal object may be automatically displayed in the video that the user is viewing in response to completion of the payment process to purchase the normal object.

In another embodiment, in response to completion of the payment process performed by the object purchase processing unit 21h for the effect object to be purchased, a notification of the completion of the payment process may be sent to the client device 10a, and a confirmation screen may be displayed to confirm whether the viewing user wants to make a display request to display the purchased effect object on the client device 10a. When the viewing user selects to make the display request for the purchased effect object, the display request to display the purchased effect object may be sent from the client device of the viewing user to the display request processing unit 21f, and the display request processing unit 21f may perform the process to display the purchased effect object in the display image 70 of the video. Even when the normal object is to be purchased, a confirmation screen may be displayed on the client device 10a to confirm whether the viewing user wants to make a display request to display the purchased normal object, in the same manner as above.

Next, the supporter computer 40 in one embodiment will be described. In one embodiment, the supporter computer 40 includes a computer processor 41, a communication I/F 42, a storage 43, a display 44, and an input interface 45.

Similarly to the computer processor 21, the computer processor 41 may be any computing device such as a CPU. Similarly to the communication I/F 22, the communication I/F 42 may be, a driver, software, or a combination thereof for communicating with other devices. Similarly to the storage 23, the storage 43 may be a storage device capable of storing data such as a magnetic disk. The display 44 may be a liquid crystal display, an organic EL display, an inorganic EL display or any other display device capable of displaying images. The input interface 45 may be any input interface that receives input from the supporter such as a mouse and a keyboard. The display 44 is an example of a second display device.

Figure 9:
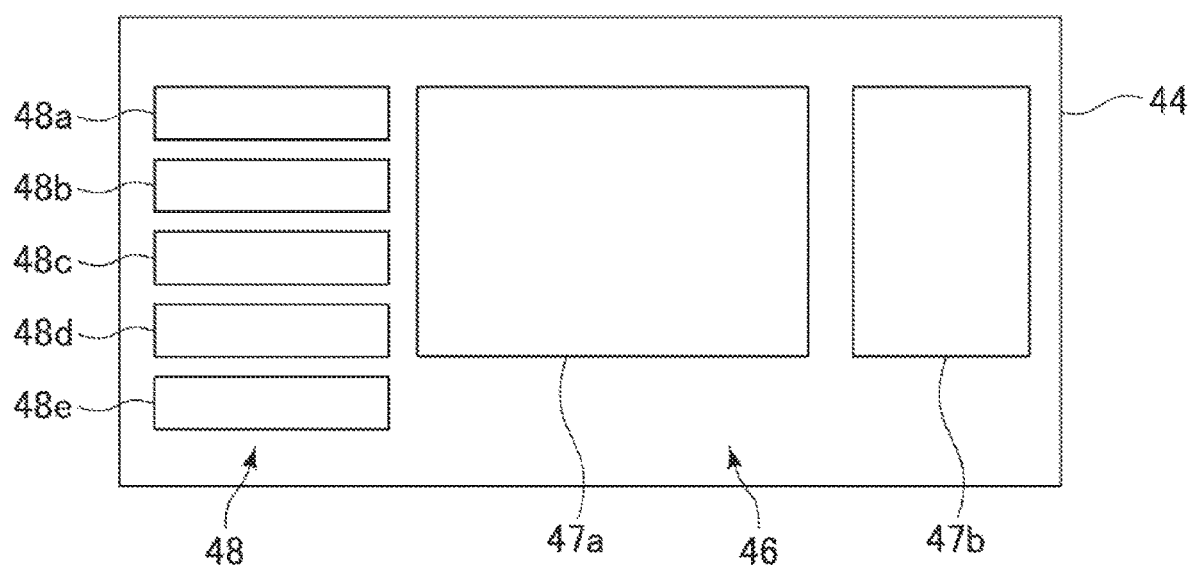
FIG. 9 illustrates an example of an image displayed on a display 44 of a supporter computer 40 in one embodiment.

FIG. 9 illustrates an example of an image displayed on the display 44 of the supporter computer 40. In the illustrated embodiment, a display image 46 displayed on the display 44 includes a first display area 47a for displaying a display screen of a video in a first type client device (for example, a personal computer), a second display area 47b for displaying a display screen of the video in a second type client device (for example, a smart phone), and a plurality of operation icons 48.

By monitoring the video displayed in the first display area 47a, the supporter is able to check whether the video distributed to the first type client device is normally displayed. Similarly, by monitoring the video displayed in the second display area 47b, the supporter is able to check whether the video distributed to the second type client device is normally displayed.

In the illustrated embodiment, the operation icon 48 includes a first operation icon 48a, a second operation icon 48b, a third operation icon 48c, a fourth operation icon 48d, and a fifth operation icon 48e. The supporter is able to select a desired operation icon via the input interface 45. When the first operation icon 48a, the second operation icon 48b, the third operation icon 48c, the fourth operation icon 48d, and the fifth operation icon 48e are selected by the supporter, the supporter computer 40 receives a first operation input, a second operation input, a third operation input, a fourth operation input, and a fifth operation input, respectively.

Functions realized by the computer processor 41 will be now described more specifically. The computer processor 41 functions as an additional information display unit 41a and a distribution management unit 41b by executing computer-readable instructions included in a predetermined program. At least some of the functions that can be realized by the computer processor 41 may be realized by a computer processor other than the computer processor 41 of the video distribution system 1. At least some of the functions realized by the computer processor 41 may be realized by, for example, the computer processor 21.

The additional information display unit 41a is configured to add various additional information to the video in accordance with various operation inputs from the supporter via the input interface 45.

In one embodiment, when the supporter computer 40 receives the first operation input made by selecting the first operation icon 48a, the additional information display unit 41a is configured to display a message 101 in the video displayed on the display 39 based on the first operation input, while the additional information display unit 41a makes the message 101 undisplayed on the client device. The message 101 is an example of first additional information.

Figure 10:
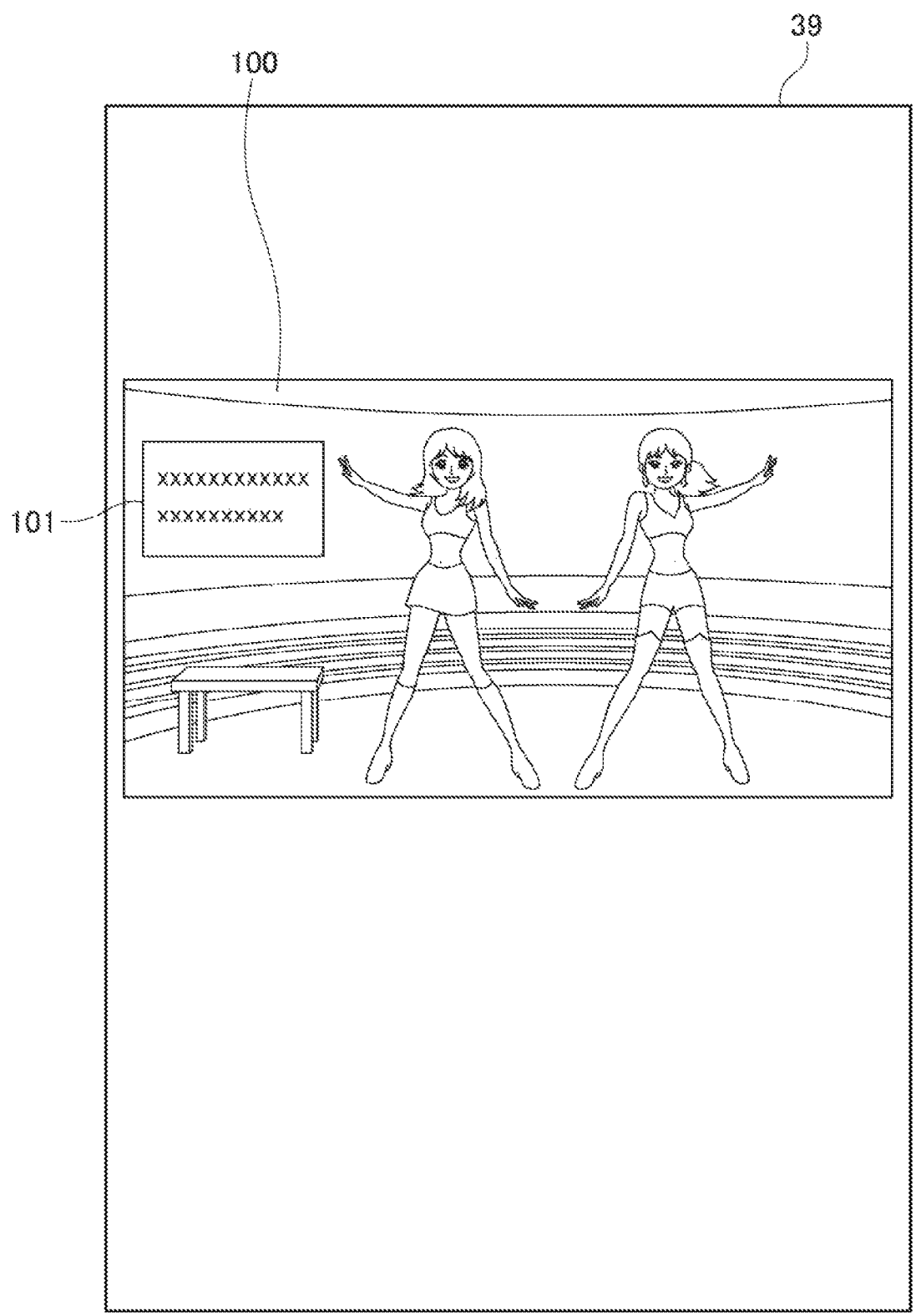
FIG. 10 illustrates an example of an image displayed on a display 39 of a supporter computer 40 and an example of first additional information in one embodiment.

FIG. 10 shows an example of a display image of the video displayed on the display 39. The display image 100 shown in FIG. 10 includes the message 101. The display image 100 is similar to the display image 70 (see FIG. 5) of the video distributed and displayed on the client device of the viewing user at the same time except that the display image 100 includes the message 101. That is, the display image 100 displayed on the display 39 is configured by adding the message 101 to the video being distributed.

The message 101 is, for example, a text message input by a supporter. The message 101 may include image information instead of text format information or in addition to the text format information. The message 101 may include an instruction on an actor's performance, an instruction on an actor's statement, an instruction on an actor's position, and various other instructions or messages related to the live distributed video.

In one embodiment, when a supporter selects the first operation icon 48a on the supporter computer 40, a window that allows the supporter to input a message is displayed on the display 44 of the supporter computer 40. The supporter is able to input a message in a message input area of the window by operating the input interface 45. The inputted message is transmitted from the supporter computer 40 to the display 39. The display 39 and the client devices 10a to 10c display the video distributed by the video distribution unit 21e. On the display 39, the message received from the supporter computer 40 is displayed as a message 101 in a predetermined area of the video distributed by the video distribution unit 21e as shown in FIG. 10. Whereas in the video displayed on the client devices 10a to 10c, the message 101 or information corresponding thereto is not displayed. According to this embodiment, it is possible to communicate instructions and messages regarding the live distributed video to the actor or other distribution staff member who can see the display 39 without affecting the video viewed by viewing users of the client devices.

Subsequently, display of the second additional information will be described with reference to FIGS. 11a and 11b. In one embodiment, once the second operation icon 48b is selected and the second operation input is received by the supporter computer 40, the additional information display unit 41a is configured to display an interruption image in the video displayed on the display 39 and the video displayed on the client devices based on the second operation input. The interruption image is an example of the second additional information. The second operation input may be input to the server device 20 or the supporter computer 40 in accordance with operation of the controller 33a or 33b by the actor A1 or operation of the controller 34a or 34b by the actor A2.

Figure 11A:
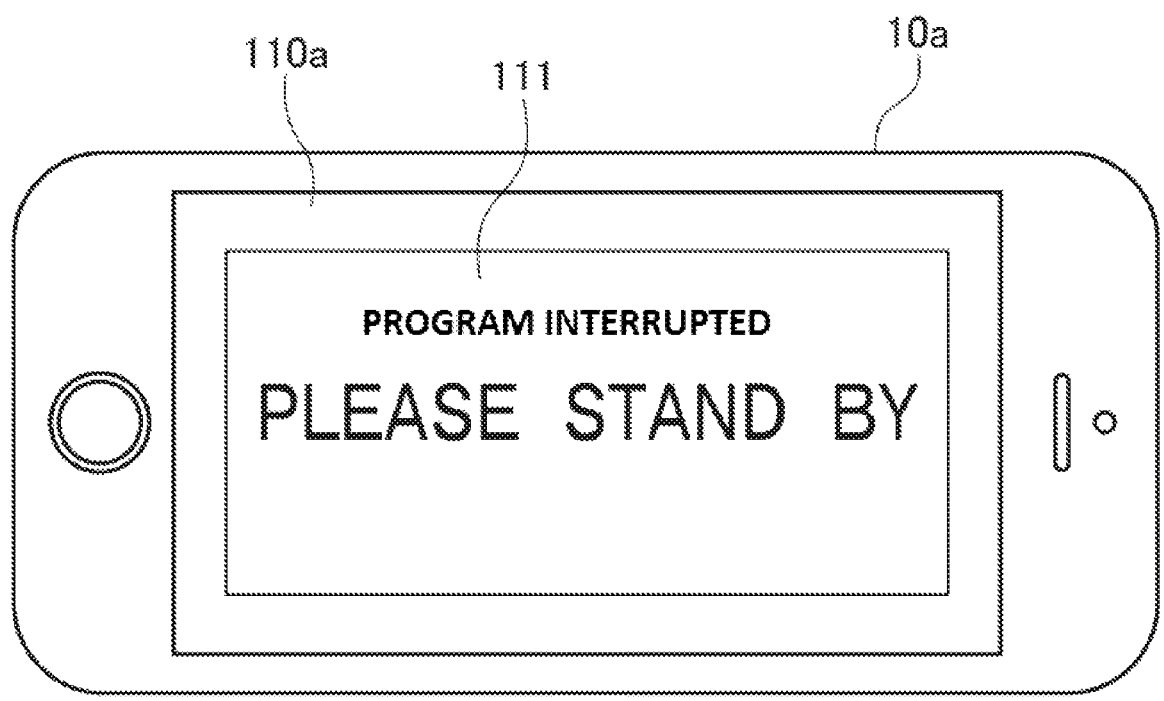
FIG. 11a illustrates an example of a video displayed on the client device 10a in one embodiment, and FIG. 11a includes second additional information.
Figure 11B:
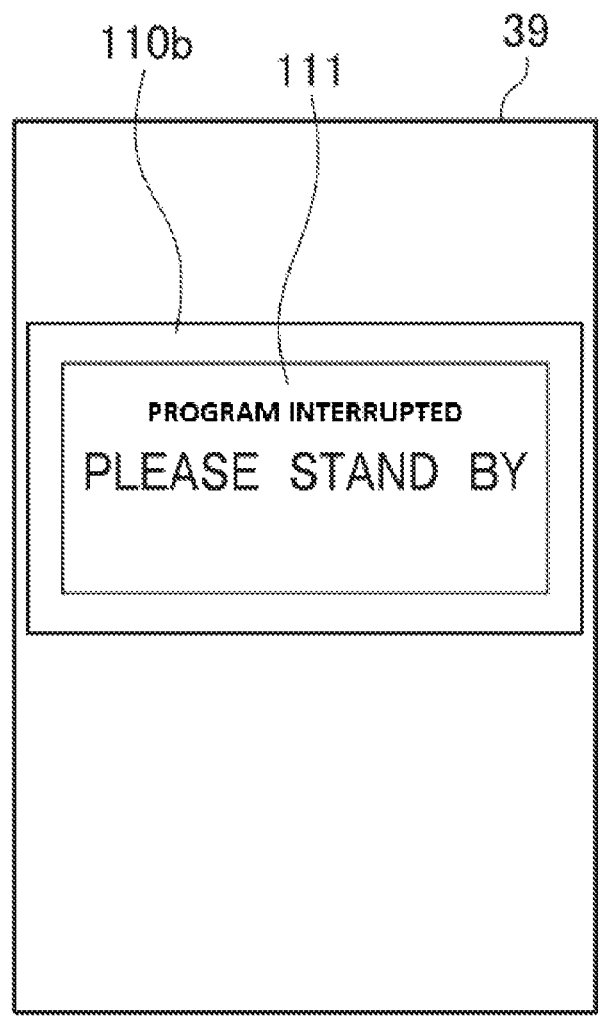
FIG. 11b illustrates an example of the video displayed on the client device 10a in one embodiment, and FIG. 11b includes the second additional information.

FIG. 11a shows an example of a display image 110a displayed on the client device 10a when the second operation input is received, and FIG. 11b shows an example of a display image 110b displayed on the display 39 when the second operation input received. Both the display image 110a and the display image 110b include an interruption image 111. The interruption image 111 is disposed in the top layer of the live distributed video. Thus, the interruption image 111 is displayed on the screen of the client device and the display 39 on which the video is being played Although there may be a slight visual difference between the interruption image 111 displayed on the client device and the interruption image 111 displayed on the display 39 due to a difference in the performance of the display device, both are substantially the same image.

In the illustrated embodiment, the interruption image 111 is an image that is displayed in emergency instead of displaying a video containing a normal virtual space and a character object when an unexpected situation occurs during a live distribution of the video. The supporter is able to select the second operation icon 48b on the supporter computer 40, for example, when trouble occurs in motion control of the character object due to a failure of equipment used in the studio room R. The additional information display unit 41a performs processing for displaying the interruption image 111 on each client device and the display 39 in response to the selection of the second operation icon 48b. In response to reception of the second operation input, the additional information display unit 41a may cause the interruption image 111 to be superimposed on the live-distributed video. In response to reception of the second operation input, the additional information display unit 41a may transmit a control signal for displaying the interruption image 111 to the client device. Upon receipt of the control signal, the client device that received the control signal may perform a process to superimpose the interruption image 111 on the video being played or a process to display the interruption image 111 instead of the video being played When the first operation input is accepted by the selection of the first operation icon 48a while the interrupt image 111 is displayed on the display 39, the additional information display unit 41a causes the display 39 to superimpose on the interrupt image 111 to be a message. 101 may be displayed.

In the above embodiment, when an unexpected situation occurs during a live distribution of a video, the interruption image 111 that is displayed in emergency is distributed to the client devices and the display 39 instead of continuing to distribute the video. The distributor can handle the situation while the interruption image 111 is displayed.

Display of the second additional information will be now described with reference to FIGS. 11a and 11b. In one embodiment, when the third operation icon 48c is selected and the third operation input is received by the supporter computer 40, the additional information display unit 41a is configured to generate a modified character object and performs processing for distribution of a video that contains the modified character object. The third operation input may be input to the server device 20 or the supporter computer 40 in accordance with operation of the controller 33a or 33b by the actor A1 or operation of the controller 34a or 34b by the actor A2.

Figure 12A:
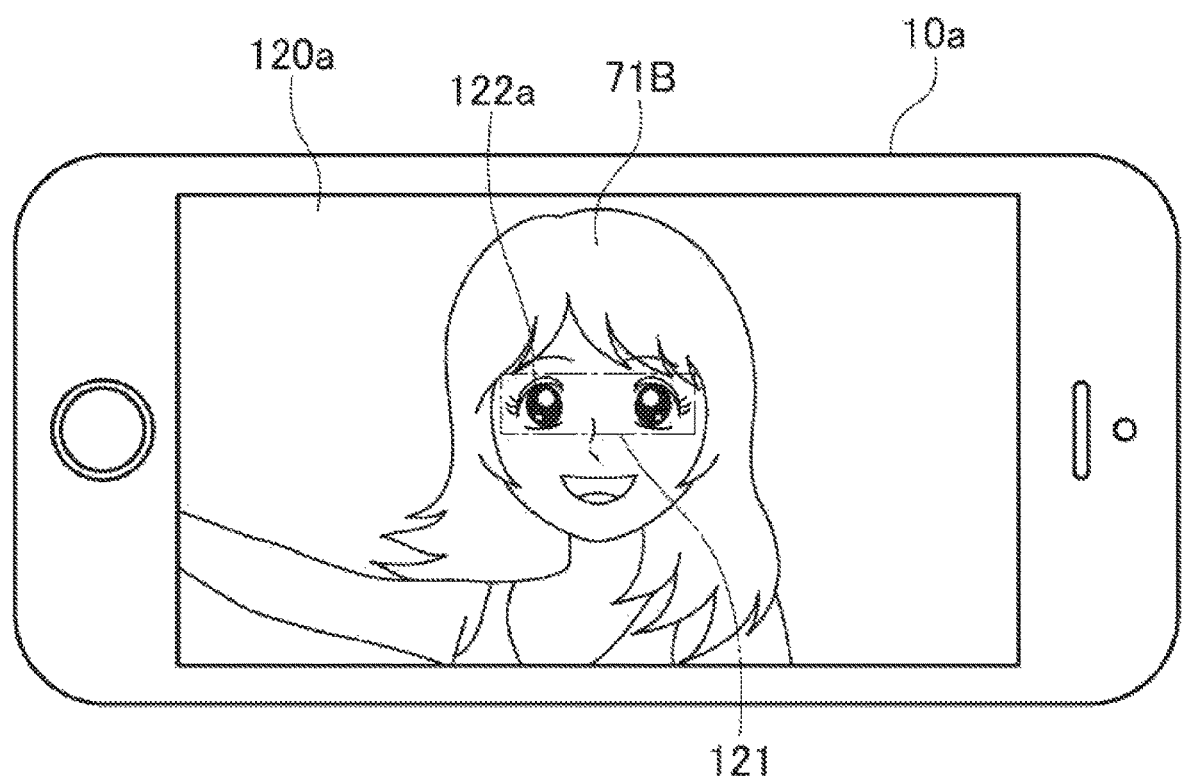
FIG. 12a illustrates an example of a video displayed on the client device 10a in one embodiment, and FIG. 12a includes third additional information.
Figure 12B:
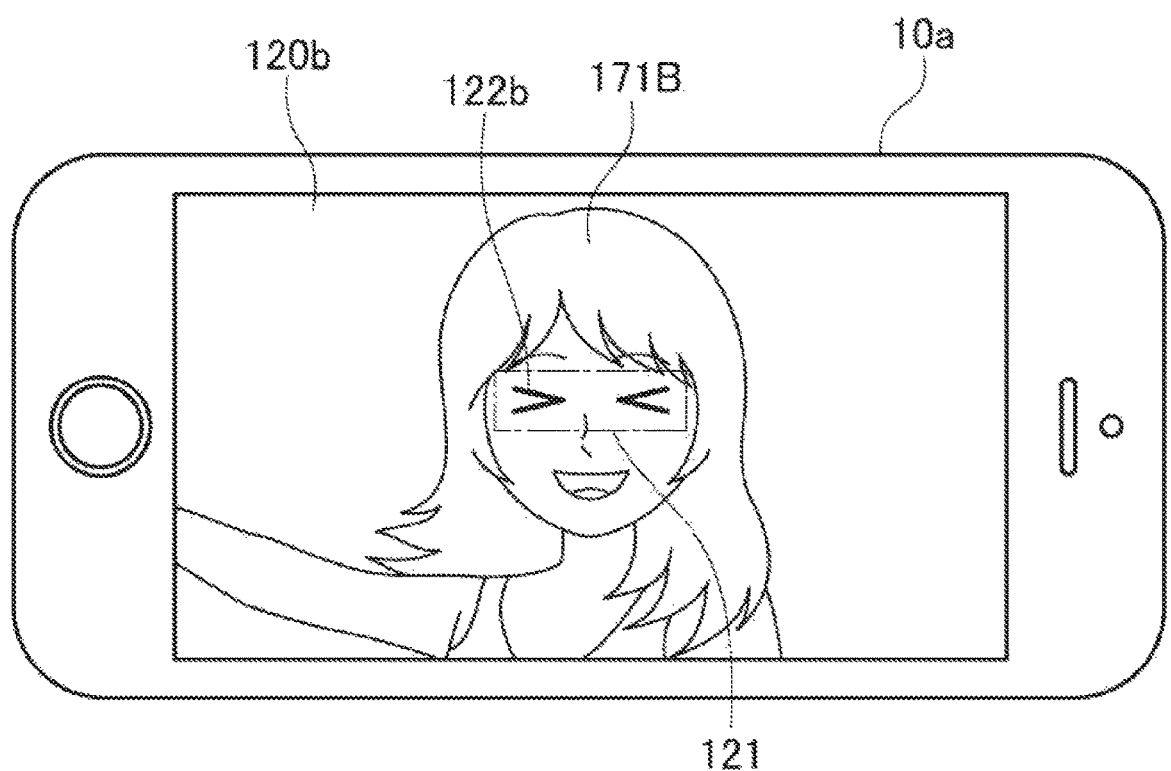
FIG. 12b illustrates an example of the video displayed on the client device 10a in one embodiment, and FIG. 12b includes third additional information.

FIG. 12a shows another example of a display image 120a displayed on the client device 10a, and FIG. 12b shows an example of a display image 120b displayed on the client device 10a. The display image 120a of FIG. 12a includes the character object 71B, and the display image 120a of FIG. 12b includes a modified character object 171B which will be described later. As described above, facial expression of the character object 71B is controlled so as to change in synchronization with the change of the facial expression of the actor A2 based on the face motion data of the actor A2. In this specification, all or part of the portion of the character object that changes based on the face motion data may be referred to as a "face portion." In the illustrated embodiment, motion control is performed such that eyes of the character object 71B moves in synchronization with the eye motion of the actor A2, so that the face portion 121 is set in the position where includes both eyes of the character object 71B. The face portion 121 may be set to include the entire face of the character object 71B.

In the display image 120a shown in FIG. 12a, the image of the eyes of the character object 71B displayed in the face portion 121 is generated by applying the face motion data to the model data. Whereas the image of the eyes displayed in the face portion 121 in the display image 120b of FIG. 12b is a prepared image 122b that is prepared in advance before the start of the video distribution to be fitted in the face portion 121. The prepared image 122*b* may be stored in the storage 23. The prepared image 122*b* is an example of third additional information.

In one embodiment, the additional information display unit 41*a* is configured to display the prepared image 122*b* composited in the face portion 121 of the character object 71B when the third operation input is received For example, when the third operation input is received, the additional information display unit 41*a* transmits a modification instruction to the animation generation unit 21*c,* and the animation generation unit 21*c* composites the prepared image 122*b* to be fitted in the face portion 121 of the character object 71B in accordance with the modification instruction from the additional information display unit 41*a* instead of using the image generated based on the face motion data in order to generate an animation of the modified character object 171B. In this specification, a character object into which the prepared image 122*b* is inserted, not the image generated based on the face motion data, may be referred to as a modified character object. The modified character object is an object in which a part of the character object generated by the animation generation unit 21*c* is modified In the above example, the animation of the modified character object 171B is generated by compositing the prepared image 122*b* to be displayed in the face portion 121 of the character object 71B generated by the animation generation unit 21*c*. In response to reception of the third operation input, the additional information display unit 41*a* may transmit a control signal for displaying the prepared image 122*b* to the client device. Upon receipt of the control signal, the client device may perform a process to composite the prepared image 122*b* to be displayed in the character object in the video being played.

The process of applying the face motion data to the model data to change the facial expression of a character object imposes a high processing load on the processor. For this reason, the facial expression of the character object may fail to follow the facial expression of the actor in a timely manner. Since character's voice and motions other than the facial expression can follow timely to the voice and body motions of the actor movement, if the facial expression of the character object fails to follow the facial expression of the actor in a timely manner, it may give the viewing users a feeling of strangeness. In the above embodiment, when the facial expression of the character object fails to follow the facial expression of the actor timely, the modified character object that incorporates the prepared image 122*b* to be fitted therein is generated, and the video containing the modified character object is distributed. In this way, it is possible to prevent deterioration of the quality of the video caused by the fact that the facial expression of the character object fails to follow the facial expression of the actor.

The storage 23 may store a plurality of different types of images as candidates of the prepared image 122*b* to be composited The candidates of the prepared image 122*b* are displayed on the display 44 of the supporter computer 40, and an image selected by the supporter from among the candidates may be used as the prepared image 122*b* to be composited.

Display of a blind object will be now described with reference to FIG. 13. In one embodiment, when the fourth operation icon 48*c* is selected and the fourth operation input is received by the additional information display unit 41*a,* the additional information display unit 41*a* displays a blind object that is used to hide at least a part of the character object that wears the decorative object. The fourth operation input may be input to the server device 20 or the supporter computer 40 in accordance with operation of the controller 33*a* or 33*b* by the actor A1 or operation of the controller 34*a* or 34*b* by the actor A2. In response to reception of the fourth operation input, the additional information display unit 41*a* may transmit a control signal for displaying the prepared image 122*b* to the client device. Upon receipt of the control signal, the client device that received the control signal may display the blind object such that the blind object is superimposed on the video being played.

Figure 13:
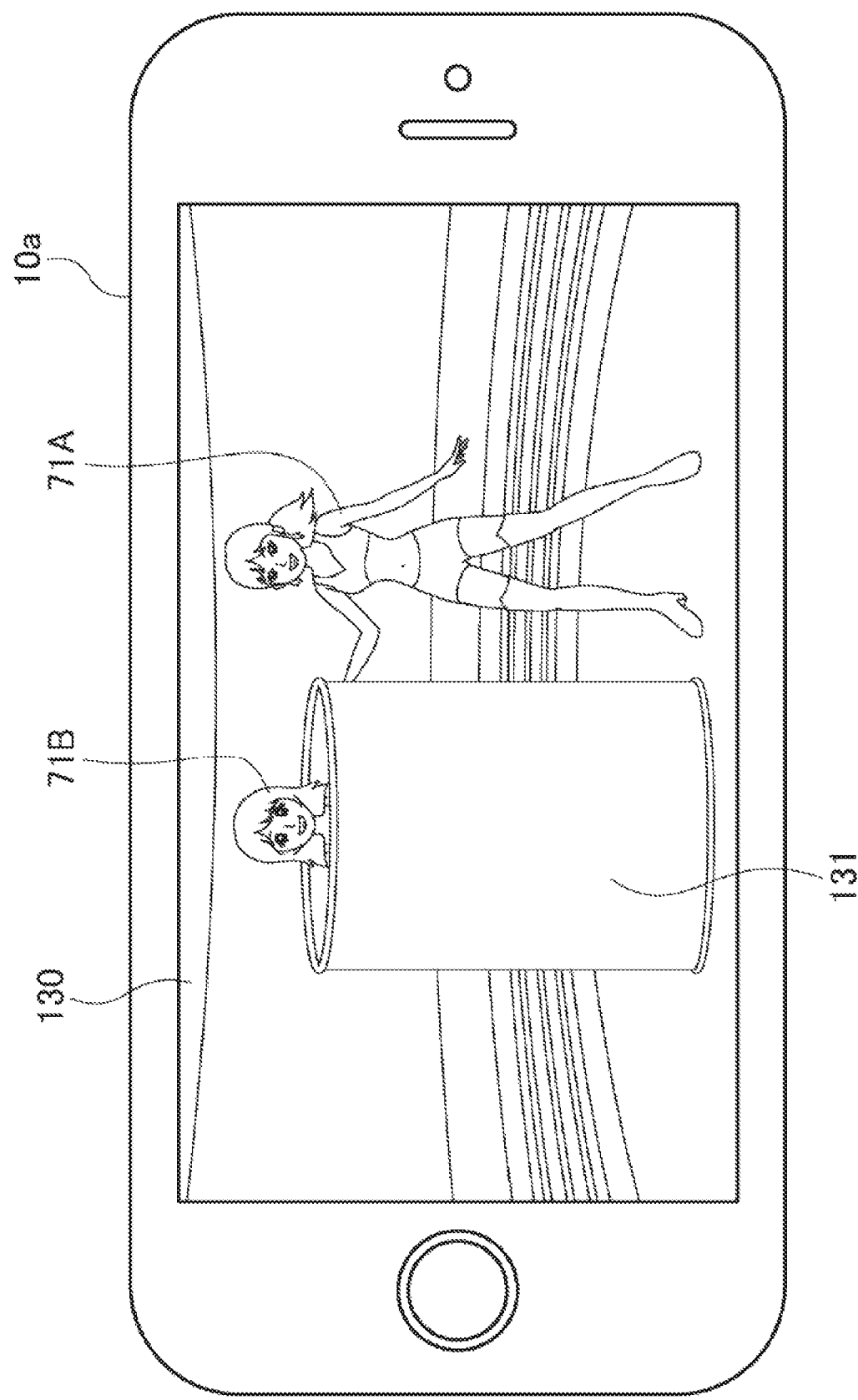
FIG. 13 illustrates an example of a video displayed on the client device 10a in one embodiment, and FIG. 13 includes a blind object.

In the embodiment of FIG. 13, it is assumed that a T-shirt is selected as the decoration object to be attached to the character object 71B in the selection screen 80. The additional information display unit 41*a* may display the blind object such that the blind object hides a part of the character object 71B that is associated with the selected decorative object. In the display image 130 of FIG. 13, a blind object 131 is displayed such that at least the torso of the character object 71B associated with the T-shirt, which is the selected decorative object, is hidden by the blind object 131.

A process for prohibiting the distribution of a video to a banned user will be described. In one embodiment, when the fifth operation icon 48*e* is selected and a fifth operation input is received by the distribution management unit 41*b,* the distribution management unit 41*b* performs a process for prohibiting distribution of the video to a specific viewing user or a specific client device. In one embodiment, when the fifth operation icon 48*e* is selected during distribution of a video, a list of users who are viewing the video is displayed. The distribution management unit 41*b* performs a process for ceasing the distribution of the video to a user(s) selected by the supporter or the actor from the list. For example, the distribution management unit 41*b* may flag the selected user (distribution banned user) to identify the user in the distribution destination list of the video. The video distribution unit 21*e* may distribute the video to users with no flag that is used to identify the banned user, among the users included in the distribution destination list of the video. In this way, the distribution of the video to the banned user is stopped. In another embodiment, the distribution management unit 41*b* may be configured to make a user(s) selected by the supporter or the actor from the list of the users who are viewing the live distributed video inaccessible to some of the functions that are normally available to the users. For example, the distribution management unit 41*b* may be configured to prohibit a user who has posted an inappropriate message from posting of a new message. The user who is prohibited from posting a message is allowed to continue viewing the video even after the prohibition, but is no longer allowed to post a message on the video.

Figure 14:
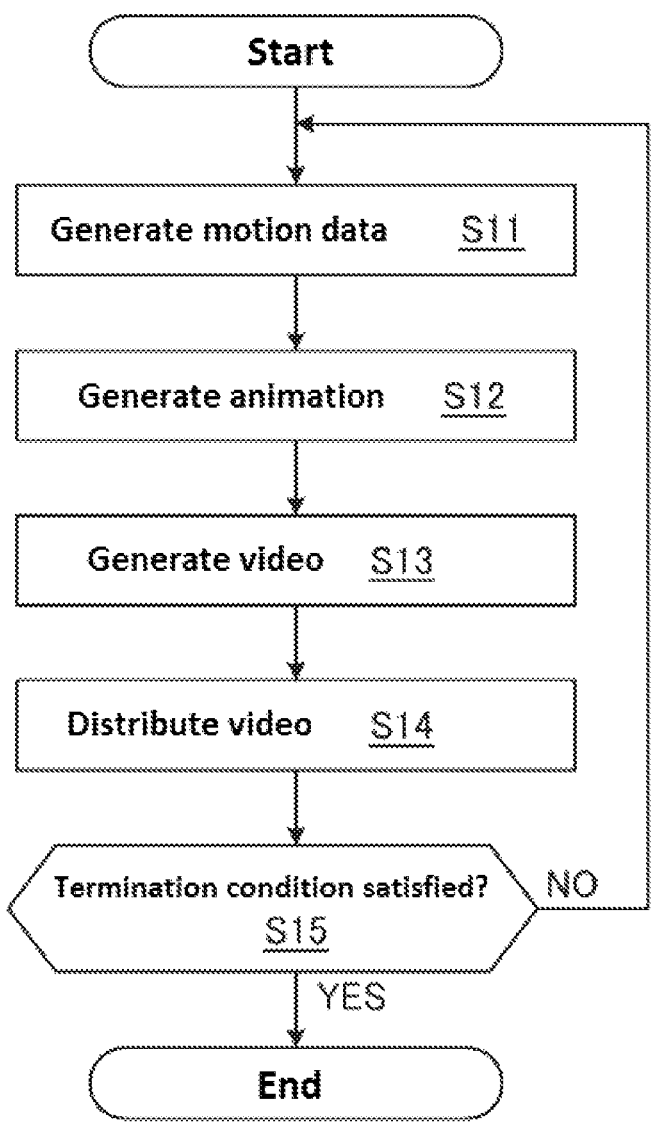
FIG. 14 is a flow chart showing a flow of a video distribution process in one embodiment.
Figure 15:
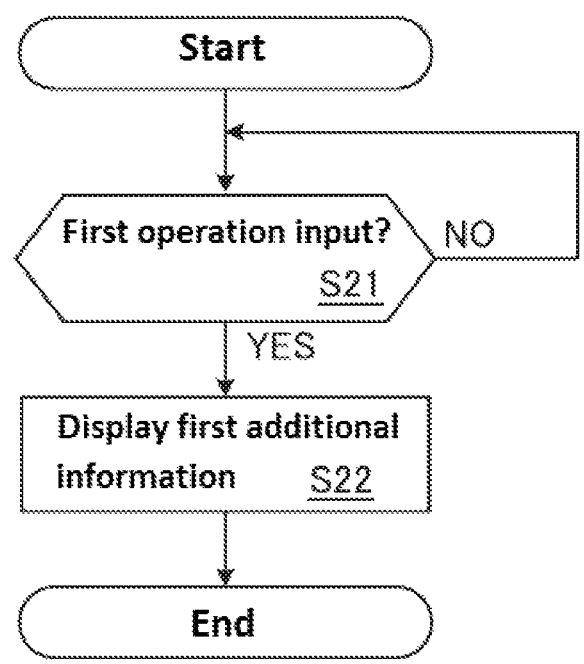
FIG. 15 is a flowchart of a process of displaying the first additional information in one embodiment.
Figure 16:
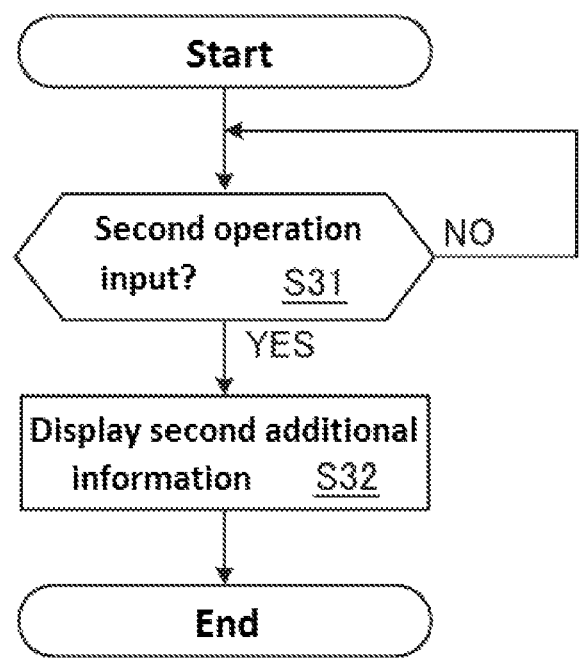
FIG. 16 is a flowchart of a process of displaying the second additional information in one embodiment.
Figure 17:
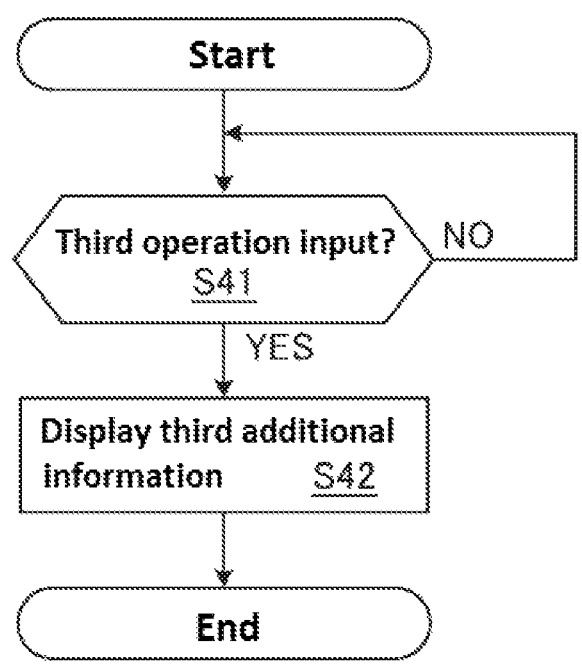
FIG. 17 is a flowchart of a process of displaying the third additional information in one embodiment.
Figure 18:
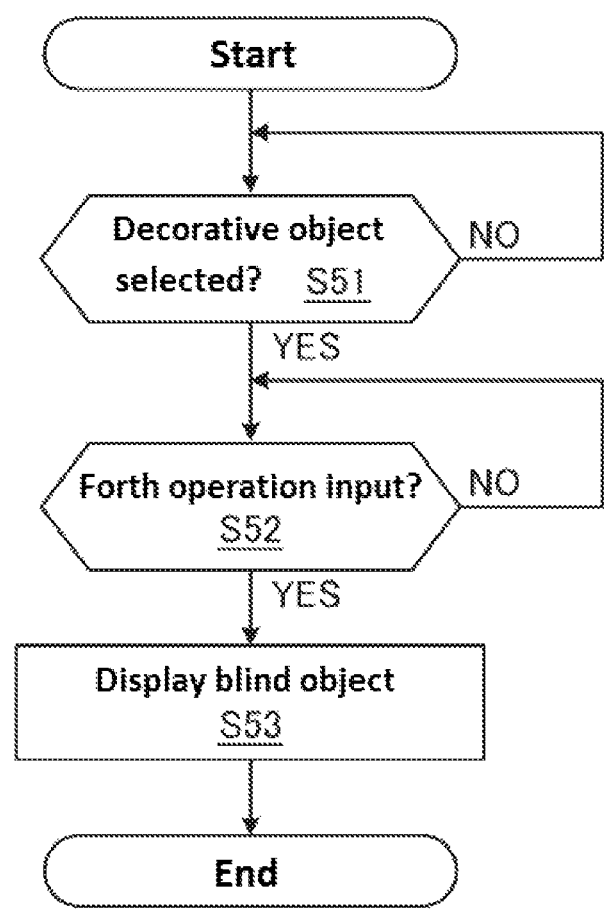
FIG. 18 is a flowchart of a process of displaying a blind object in one embodiment.
Figure 19:
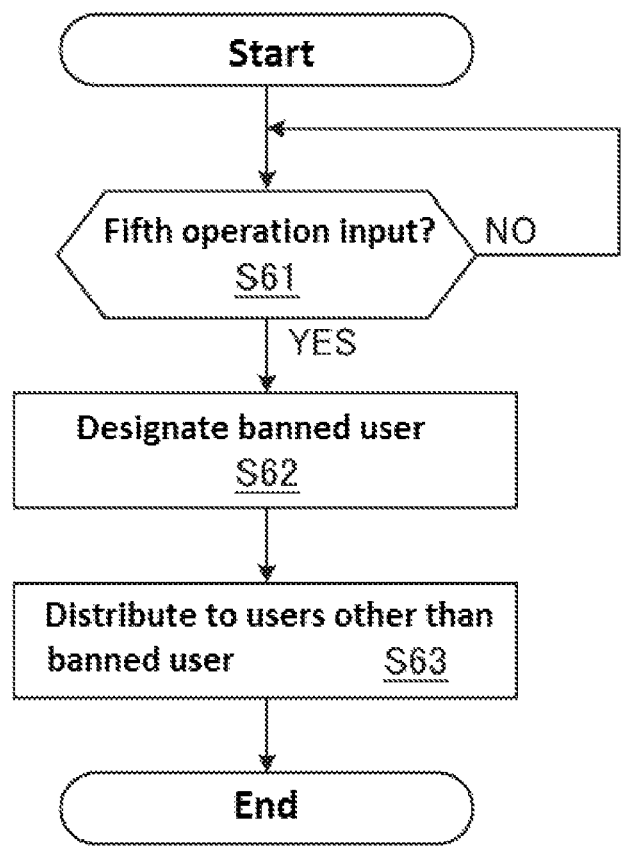
FIG. 19 is a flow chart showing a flow of a process for prohibiting video distribution to a banned user in one embodiment.

Next, with reference to FIGS. 14 to 19, a video distribution process in one embodiment will be described. FIG. 14 is a flow chart showing a flow of a video distribution process in one embodiment, FIG. 15 is a flowchart of a process of displaying the first additional information in one embodiment, FIG. 16 is a flowchart of a process of displaying the second additional information in one embodiment, FIG. 17 is a flowchart of a process of displaying the third additional information in one embodiment, FIG. 18 is a flowchart of a process of displaying the blind object in one embodiment, and FIG. 19 is a flow chart showing a flow of a process for prohibiting the video distribution to a banned user in one embodiment.

First, a video distribution process in one embodiment will be described with reference to FIG. 14, In the video distribution process, it is assumed that the actor A1 and the actor A2 are giving performances in the studio room R. First, in step S11, body motion data, which is a digital representation of the body motions of the actor A1 and the actor A2, and face motion data, which is a digital representation of the facial motions (expression) of the actor A1 and the actor A2, are generated. Generation of the body motion data is performed, for example, by the body motion data generation unit 21a described above, and generation of the face motion data is performed, for example, by the face motion data generation unit 21b described above.

Next, in step S12, the body motion data and the face motion data of the actor A1 are applied to the model data for the actor A1 to generate animation of the first character object that moves in synchronization with the motions of the body and facial expression of the actor A1. Similarly, the body motion data and the face motion data of the actor A2 are applied to the model data for the actor A2 to generate animation of the second character object that moves in synchronization with the motions of the body and facial expression of the actor A2. The generation of the animation is performed, for example, by the above-described animation generation unit 21c.

Next, in step S13, a video including the animation of the first character object corresponding to the actor A1 and the animation of the second character object corresponding to the actor A2 is generated. The voices of the actor A1 and the actor A2 may be included in the video. The animation of the first character object and the animation of the second character object may be provided in the virtual space. Generation of the video is performed, for example, by the above-described video generation unit 21d.

Next, the process proceeds to step S14 and the video generated in step S13 is distributed. The video is distributed to the client devices 10a to 10c and other client devices over the network 50. The video may be distributed to the supporter computer 40 and/or may be projected on the screen S in the studio room R. The video is distributed continuously over a predetermined distribution period. The distribution period of the video may be set to, for example, 30 seconds, 1 minute, 5 minutes, 10 minutes, 30 minutes, 60 minutes, 120 minutes, and any other length of time.

Subsequently in step S15, it is determined whether a termination condition for ending the distribution of the video is satisfied. The end condition is, for example, that the distribution ending time has come, that the supporter computer 40 has issued an instruction to end the distribution, or any other conditions. If the end condition is not satisfied, the steps S11 to S14 of the process are repeatedly executed, and distribution of the video including the animation synchronized with the motions of the actor A1 and the actor A2 is continued. When it is determined that the end condition is satisfied for the video, the distribution process of the video is ended.

Next, with reference to FIG. 15, a description is given of a process of displaying the first additional information that is performed during a video live-distribution. In step S21, it is determined whether the first operation input has been made during the video live-distribution. For example, when the first operation icon 48a is selected on the supporter computer 40, it is determined that the first operation input has been made. When the first operation input has been made, the display process of the first additional information proceeds to step S22. In step S22, the message 101, which is an example of the first additional information, is shown on the video displayed on the display 39, and the display process to display the first additional information ends. The message 101 is not displayed on the client device at this time.

With reference to FIG. 16, a process of displaying the second additional information during a video live-distribution will be now described. In step S31, it is determined whether the second operation input has been made during the video live-distribution. For example, when the second operation icon 48b is selected on the supporter computer 40, it is determined that the second operation input has been made. When the second operation input has been made, the display process of the second additional information proceeds to step S32. In step S32, the interruption image 111, which is an example of the second additional information, is displayed on the client device(s) and the display 39, and the display process to display the second additional information ends.

With reference to FIG. 17, a process of displaying the third additional information during a video live-distribution will be now described. In step S41, it is determined whether the third operation input has been made during the video live-distribution. For example, when the third operation icon 48c is selected on the supporter computer 40, it is determined that the third operation input has been made. When the third operation input has been made, the display process to display the third additional information proceeds to step S42. In step S42, the prepared image 122b, which is an example of the third additional information, is displayed in the face portion of the character object, and the display process to display the third additional information ends.

Next, with reference to FIG. 18, a description is given of a display process to display the blind object during a video live-distribution. In step S51, it is determined whether selection of a decorative object that is to be attached to the character object appearing in the video has been made during the video live-distribution. As described above, the decorative object attached to the character object may be selected from among the candidates in the candidate list 23d. The process to select the decorative object is performed, for example, by the above-mentioned decorative object selection unit 21g.

When it is determined in step S51 that the decorative object has been selected, the process proceeds to step S52. In step S52, it is determined whether the fourth operation input has been made. For example, when the fourth operation icon 48d is selected on the supporter computer 40, it is determined that the fourth operation input has been made. When the fourth operation input has been made, the display process to display the blind object proceeds to step S53. In another embodiment, when the decorative object is selected from the candidate list 23d, it may be determined that the fourth operation input has been made. In this case, step S52 is omitted, and the display process to display the blind object proceeds from step S51 to step S53.

In step S53, the blind object 131 is displayed such that it hides at least a part of the character object. For example, when the decorative object selected in step S51 is a T-shirt, the blind object 131 is added to the video so as to hide the torso of the character object where is associated with the T-shirt.

With reference to FIG. 19, the process for prohibiting the distribution of a video to a specific user will be further described. In step S61, it is determined whether the fifth operation input has been made during a video live-distribution. For example, when the fifth operation icon 48e is selected on the supporter computer 40, it is determined that the fifth operation input has been made.

When the fifth operation input has been made, the distribution prohibition process proceeds to step S62. In step S62, a user (banned user) to whom the video is prohibited from being distributed is designated. For example, a list of users who are watching the video is displayed on the display 44 of the supporter computer 40, and a user selected by the supporter from this list is designated as the banned user. The process for designating the banned user is performed by, for example, the distribution management unit 41*b*.

Next, the distribution prohibition process proceeds to step S63. In step S63, the video is distributed only to users who are not designated as the banned users among the users included in the distribution destination list of the video. The video distribution process is performed, for example, by the above-described video distribution unit 21*e*.

With the video distribution system 1 in the above embodiment, it is easy to handle with an unexpected situation occurred during a live distribution. For example, by displaying the message 101 on the display 39 without displaying the message 101 on the client device(s), it is possible to communicate instructions and messages regarding the live distributed video to the actor or other distribution staff member who can see the display 39 without affecting the video viewed by viewing users.

In the above-described another embodiment, when an unexpected situation occurs during a live distribution of a video, the interruption image 111 displayed in emergency is distributed to the client devices and the display 39 instead of continuing to distribute the video.

In the above-described yet another embodiment, when the facial expression of the character object fails to follow the facial expression of the actor timely, the modified character object that incorporates the prepared image 122*b* to be fitted therein is generated, and the video containing the modified character object is distributed. In this way, it is possible to prevent deterioration of the quality of the video caused by the fact that the facial expression of the character object fails to follow the facial expression of the actor.

In the above-described still yet another embodiment, even when some viewing users take inappropriate actions such as posting inappropriate messages, it is possible to stop the distribution of the video to such viewing users.

Embodiments of the invention are not limited to the above-described embodiments, and various modifications can be made without departing from the scope of the invention. For example, shooting and production of the video to be distributed may be performed outside the studio room R. For example, video shooting to generate a video to be distributed may be performed at an actor's or supporter's home.

The procedures described herein, particularly those described with a flowchart, are susceptible of omission of part of the steps constituting the procedure, adding steps not explicitly included in the steps constituting the procedure, and/or reordering the steps. The procedure subjected to such omission, addition, or reordering is also included in the scope of the present invention unless diverged from the purport of the present invention.

What is claimed is:

1. A video distribution system comprising:
  a distribution server configured to distribute a live video to a plurality of client devices, wherein the live video contains an animation of a character object generated based on one or more motions of an actor, and wherein the plurality of client devices include a first client device used by a first user;
  a first display device disposed at a position viewable by the actor, the first display device being configured to display the live video to the actor as the one or more motions of the actor are performed; and
  a supporter computer comprising a second display device, the supporter computer being located remotely from the first display device and is configured to (i) display the live video on the second display device, (ii) allow a supporter user to input first additional information, (iii) cause the first additional information to be displayed in the live video that is being displayed to the actor on the first display device based on a first operation input, and (iv) cause the first additional information to not be displayed on any of the plurality of client devices.

2. The video distribution system of claim 1, wherein the supporter computer is further configured to cause second additional information to be displayed (i) in the live video being displayed on the first display device, and (ii) in the live video being displayed on the first client device based on a second operation input.

3. The video distribution system of claim 1, wherein the supporter computer is further configured to cause a modified character object in which at least a part of the character object is modified to be generated based on a third operation input, and cause the modified character object to be included in the live video.

4. The video distribution system of claim 3, wherein:
  the character object has a face portion that is generated so as to move based on face motion data representing face motions of the actor, and
  the distribution server is configured to cause third additional information to be displayed in the face portion based on the third operation input.

5. The video distribution system of claim 1, further comprising:
  a storage storing a decorative object displayed in association with the character object,
  wherein the supporter computer is configured to cause a blind object to be displayed for hiding at least a part of the character object when the decorative object is displayed in the live video based on a fourth operation input.

6. The video distribution system of claim 1, wherein:
  the plurality of client devices includes a second client device used by a second user;
  the distribution server is configured to distribute the live video to the second client device in addition to the first client device,
  the first client device is a first type of device,
  the second client device is a second type of device different from the first type of device, and
  the supporter computer includes a second display device that is configured to cause a display image to be displayed, wherein the display image comprises the live video displayed on the first client device and a display image of the live video displayed on the second client device.

7. The video distribution system of claim 1, wherein the supporter computer prohibits distribution of the live video to the first user based on a fifth operation input.

8. The video distribution system of claim 1, wherein the supporter user is not a user of any of the plurality of client devices.

9. The video distribution system of claim 1, wherein the supporter computer is operated by the supporter user.

10. The video distribution system of claim 1, further comprising:
  one or more motion sensors configured to detect the one or more motions of the actor as the one or more motions are performed, wherein the supporter computer is further located remotely from the one or more motion sensors.

11. The video distribution system of claim 10, wherein the one or more motion sensors are attached to the actor.

12. The video distribution system of claim 1, wherein the supporter computer is located in a room proximate a different room where the first display device is located.

13. The video distribution system of claim 1, wherein the supporter user selects, for display within the live video, one or more of a plurality of decorative objects capable of being displayed within live video, wherein the one or more decorative objects are displayed in association with a specific body part of the character object in the live video.

14. The video distribution system of claim 1, wherein the supporter computer is further configured to (v) generate a modified character object in which at least a part of the character object is modified based on a third operation input, and (vi) cause an animation of the modified character object to be included and displayed in the live video being distributed to the first display device and the plurality of client devices, wherein the part of the character object that is modified includes a prepared image instead of an image generated based on the one or more motions of an actor.

15. A method of distributing a video performed by executing computer readable instructions by one or more computer processor, comprising:
 distributing a live video to a plurality of client devices, wherein the live video contains an animation of a character object generated based on one or more motions of an actor, and wherein the plurality of client devices includes a first client device used by a first user;
 causing the live video to be displayed on a first display device disposed at a position viewable by the actor, wherein the first display device is configured to display the live video to the actor as the one or more motions of the actor are performed; and
 causing a supportercomputer comprising a second display device, the supporter computer being located remotely from the first display device, to (i) display the live video on the second display device, (ii) allow a supporter user to input first additional information, (iii) cause the first additional information to be displayed in the live video being displayed to the actor on the first display device based on a first operation input, and (iv) cause the first additional information to not be displayed on any of the plurality of client devices.

16. A computer-readable tangible non-transitory storage medium comprising a computer program executed by one or more computer processors, the computer program causing the one or more computer processors to effectuate operations comprising:
 distributing a live video to a plurality of client devices, wherein the live video contains an animation of a character object generated based on one or more motions of an actor, and wherein the plurality of client devices includes a first client device used by a first user;
 causing the live video to be displayed on a first display device disposed at a position viewable by the actor, wherein the first display device is configured to display the live video to the actor as the one or more motions of the actor are performed; and
 causing a supporter computer comprising a second display device, the supporter computer being located remotely from the first display device, to (i) display the live video on the second display device, (ii) allow a supporter user to input first additional information, (iii) cause the first additional information to be displayed in the live video being displayed to the actor on the first display device based on a first operation input, and (iv) cause the first additional information to not be displayed on any of the plurality of client devices.

* * * * *